United States Patent
Whalen et al.

(10) Patent No.: US 12,360,134 B2
(45) Date of Patent: Jul. 15, 2025

(54) ANGLE OF ATTACK SENSOR WITH SLOPED FACEPLATE

(71) Applicant: Rosemount Aerospace Inc., Burnsville, MN (US)

(72) Inventors: Mackenzie Whalen, Prior Lake, MN (US); Aaron A. Cusher, Eagan, MN (US); Armando Valdes Chavez, Lakeville, MN (US); Daniel Hanson, Shakopee, MN (US); Richard Alan Schwartz, Faribault, MN (US); Wallace Johnson, Prior Lake, MN (US); William B. Krueger, Bloomington, MN (US); Kaleb Anderson, Goodhue, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 193 days.

(21) Appl. No.: 17/799,855

(22) PCT Filed: Feb. 25, 2021

(86) PCT No.: PCT/US2021/019630
§ 371 (c)(1),
(2) Date: Aug. 15, 2022

(87) PCT Pub. No.: WO2021/236190
PCT Pub. Date: Nov. 25, 2021

(65) Prior Publication Data
US 2023/0073840 A1    Mar. 9, 2023

Related U.S. Application Data

(60) Provisional application No. 62/981,256, filed on Feb. 25, 2020.

(51) Int. Cl.
    *G01P 13/02*      (2006.01)
    *B64D 43/02*      (2006.01)
    *G01C 21/10*      (2006.01)

(52) U.S. Cl.
    CPC ............ *G01P 13/025* (2013.01); *B64D 43/02* (2013.01); *G01C 21/10* (2013.01)

(58) Field of Classification Search
    CPC .................................................... G01P 13/025
    See application file for complete search history.

(56) References Cited

U.S. PATENT DOCUMENTS 2,204,367 A    6/1940   Paul
2,918,817 A    12/1959   Hughes et al.
(Continued)

FOREIGN PATENT DOCUMENTS

CA    2745138 A1    1/2012
CN    105142246 A    12/2015
(Continued)

OTHER PUBLICATIONS

Extended European Search Report for European Patent Application No. 21809636.0, dated Jan. 23, 2024, 10 pages.
(Continued)

*Primary Examiner* — David Z Huang
*Assistant Examiner* — Jean F Morello
(74) *Attorney, Agent, or Firm* — Kinney & Lange, P.A.

(57) ABSTRACT

An angle of attack sensor includes a housing having an open end and a closed end, a faceplate positioned on the open end of the housing, the faceplate comprising a periphery at an outer edge of the faceplate, a central opening, and an exterior surface extending from the periphery to the central opening, and a vane assembly extending through the central opening of the faceplate. The exterior surface of the faceplate has a sloped profile from the periphery to the central opening.

23 Claims, 16 Drawing Sheets

(56) References Cited

U.S. PATENT DOCUMENTS

| | | |
|---|---|---|
| 2,995,930 A | 8/1961 | Louis |
| 3,221,549 A | 12/1965 | Wetmore |
| 3,593,337 A | 7/1971 | Ellison |
| 3,594,741 A | 7/1971 | Ellison |
| 3,665,760 A | 5/1972 | Pitches et al. |
| 3,882,721 A | 5/1975 | Neary et al. |
| 4,230,290 A | 10/1980 | Townsend et al. |
| 5,025,661 A | 6/1991 | McCormack |
| 5,322,246 A | 6/1994 | Henne et al. |
| 5,438,865 A | 8/1995 | Greene |
| 5,466,067 A | 11/1995 | Hagen et al. |
| 5,472,384 A | 12/1995 | Haga |
| 5,544,526 A | 8/1996 | Baltins et al. |
| 5,628,565 A | 5/1997 | Hagen et al. |
| 6,561,006 B1 | 5/2003 | Roberge et al. |
| 6,612,166 B2 | 9/2003 | Golly et al. |
| 6,892,584 B2 | 5/2005 | Gilkison et al. |
| 6,901,814 B2 | 6/2005 | Vozhdaev et al. |
| 6,915,687 B2 | 7/2005 | Foster et al. |
| 7,845,222 B1 | 12/2010 | Goedel et al. |
| 8,100,022 B2 | 1/2012 | Choisnet |
| 9,027,392 B2 | 5/2015 | Vander Hoek |
| 9,239,338 B2 | 1/2016 | Daup et al. |
| 9,243,963 B2 | 1/2016 | Thorpe et al. |
| 9,404,936 B2 | 8/2016 | Ashton |
| 9,574,901 B2 | 2/2017 | Dupont De Dinechin |
| 9,631,960 B2 | 4/2017 | Seidel et al. |
| 9,696,187 B2 | 7/2017 | Whalen et al. |
| 9,702,783 B2 | 7/2017 | Deangelo et al. |
| 9,772,345 B2 | 9/2017 | Golly et al. |
| 10,015,481 B2 | 7/2018 | Jarok |
| 10,124,424 B2 | 11/2018 | Frota De Souza Filho et al. |
| 10,126,320 B2 | 11/2018 | Anderson et al. |
| 10,145,265 B2 | 12/2018 | Skilton et al. |
| 10,180,077 B2 | 1/2019 | Waddington |
| 10,227,139 B2 | 3/2019 | Golly et al. |
| 10,281,303 B2 | 5/2019 | Johnson et al. |
| 10,295,396 B2 | 5/2019 | Dupont De Dinechin |
| 10,393,766 B2 | 8/2019 | Alcaya et al. |
| 10,457,412 B2 | 10/2019 | Krueger et al. |
| 10,845,377 B1 | 11/2020 | Schreiner et al. |
| 10,928,416 B2 | 2/2021 | Reid et al. |
| 2002/0189340 A1 | 12/2002 | Roberge et al. |
| 2004/0188945 A1 | 9/2004 | Poincet et al. |
| 2004/0261518 A1 | 12/2004 | Seidel et al. |
| 2010/0307422 A1 | 12/2010 | Huck et al. |
| 2010/0307442 A1 | 12/2010 | Bolender et al. |
| 2014/0263853 A1 | 9/2014 | Jackson et al. |
| 2015/0059465 A1 | 3/2015 | Leblond et al. |
| 2015/0082878 A1 | 3/2015 | Bigand |
| 2015/0344137 A1 | 12/2015 | Bartz et al. |
| 2016/0033356 A1 | 2/2016 | Deangelo et al. |
| 2016/0114883 A1 | 4/2016 | Guerry et al. |
| 2016/0356175 A1 | 12/2016 | Waddington |
| 2018/0136249 A1 | 5/2018 | Krueger et al. |
| 2018/0259547 A1 | 9/2018 | Abdullah et al. |
| 2018/0348076 A1 | 12/2018 | Martin |
| 2019/0056424 A1 | 2/2019 | Alcaya et al. |
| 2019/0056425 A1 | 2/2019 | Reid et al. |
| 2019/0210734 A1 | 7/2019 | Whalen |
| 2019/0242924 A1 | 8/2019 | Lang et al. |
| 2019/0297675 A1* | 9/2019 | Vadgaonkar ............ G01P 5/165 |
| 2019/0346476 A1* | 11/2019 | Whalen ................. G01P 15/165 |
| 2019/0346478 A1 | 11/2019 | Reid et al. |
| 2019/0346479 A1 | 11/2019 | Reid |
| 2021/0048003 A1 | 2/2021 | Egedal et al. |
| 2023/0072232 A1 | 3/2023 | Schwartz et al. |
| 2023/0073522 A1 | 3/2023 | Valdes Chavez et al. |

FOREIGN PATENT DOCUMENTS

| | | |
|---|---|---|
| CN | 104034301 B | 4/2017 |
| CN | 107687350 A | 2/2018 |
| CN | 107843249 A | 3/2018 |
| DE | 69933241 T2 | 5/2007 |
| DE | 102008007469 A1 | 8/2009 |
| EP | 0212167 A2 | 3/1987 |
| EP | 0326477 A1 | 8/1989 |
| EP | 1844863 A1 | 10/2007 |
| EP | 2787353 A1 | 10/2014 |
| EP | 2950106 A1 | 12/2015 |
| EP | 2980589 A1 | 2/2016 |
| EP | 3012187 A1 | 4/2016 |
| EP | 3056884 A1 | 8/2016 |
| EP | 3076185 A1 | 10/2016 |
| EP | 3413025 A1 | 12/2018 |
| EP | 3444618 A1 | 2/2019 |
| EP | 3567376 A1 | 11/2019 |
| EP | 3836747 A1 | 6/2021 |
| FR | 802007 A | 8/1936 |
| IN | 109738009 A | 5/2019 |
| WO | 9109274 A1 | 6/1991 |
| WO | 0177622 A2 | 10/2001 |
| WO | 03087847 A1 | 10/2003 |
| WO | 2021173816 A1 | 9/2021 |

OTHER PUBLICATIONS

International Search Report and Written Opinion for PCT Application No. PCT/US21/19630, dated Dec. 2, 2021, 15 pages.
International Search Report and Written Opinion for PCT Application No. PCT/US21/19633, dated Dec. 3, 2021, 13 pages.
International Search and Written Opinion for PCT Application No. PCT/US21/19638, dated May 7, 2021, 7 pages.
International Preliminary Report on Patentability for PCT Application No. PCT/US2021/019630, dated Sep. 9, 2022, 11 pages.
International Preliminary Report on Patentability for PCT Application No. PCT/US2021/019633, dated Sep. 9, 2022, 11 pages.
International Preliminary Report on Patentability for PCT Application No. PCT/US2021/019638, dated Sep. 9, 2022, 6 pages.
Office Action for Canadian Application No. 3, 172,897, dated Mar. 15, 2024, 5 pages.
Office Action for Canadian Application No. 3, 172,900, dated Mar. 14, 2024, 3 pages.
Extended European Search Report for European Patent Application No. 21809265.8, dated Feb. 9, 2024, 8 pages.
Extended European Search Report for European Patent Application No. 21760414.9, dated Feb. 9, 2024, 5 pages.
Communication Pursuant to Article 94(3) EPC for European Patent Application No. 18215700.8, dated Jul. 8, 2020, 4 pages.
Extended European Search Report for EP Application No. 19173597.6, dated Sep. 23, 2019, 9 pages.
Extended European Search Report for EP Application No. 19213773.5, dated Jul. 22, 2020, 13 pages.
Extended European Search Report for European Patent Application No. 18215700.8 dated May 20, 2019, 9 pages.
Extended European Search Report for European Patent Application No. 19173355.9, dated Sep. 11, 2019, 12 pages.
Extended European Search Report for European Patent Application No. 19173361.7, dated Sep. 11, 2019, 11 pages.
Extended European Search Report for European Patent Application No. 21209813.1, dated Mar. 29, 2022.

* cited by examiner

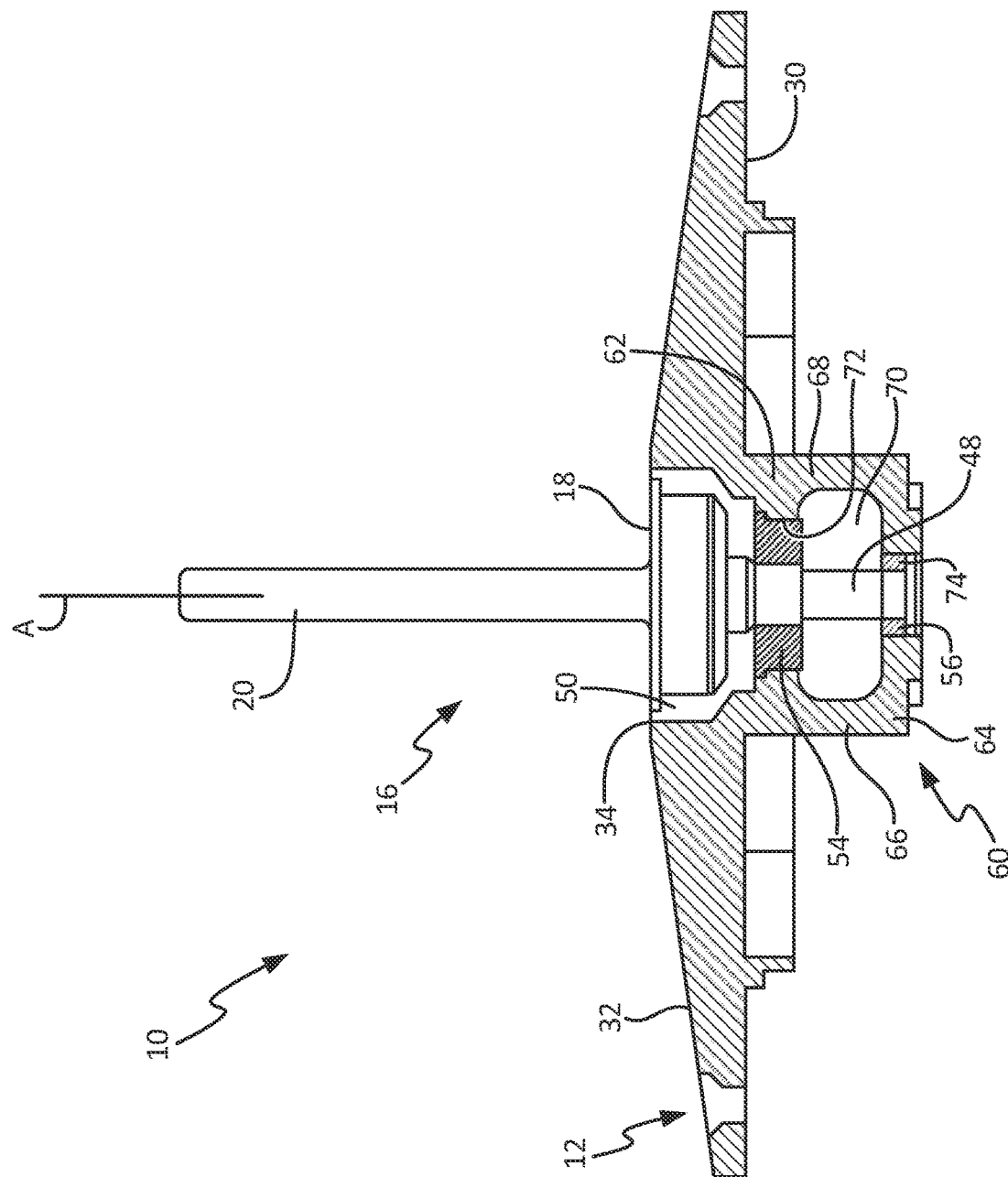

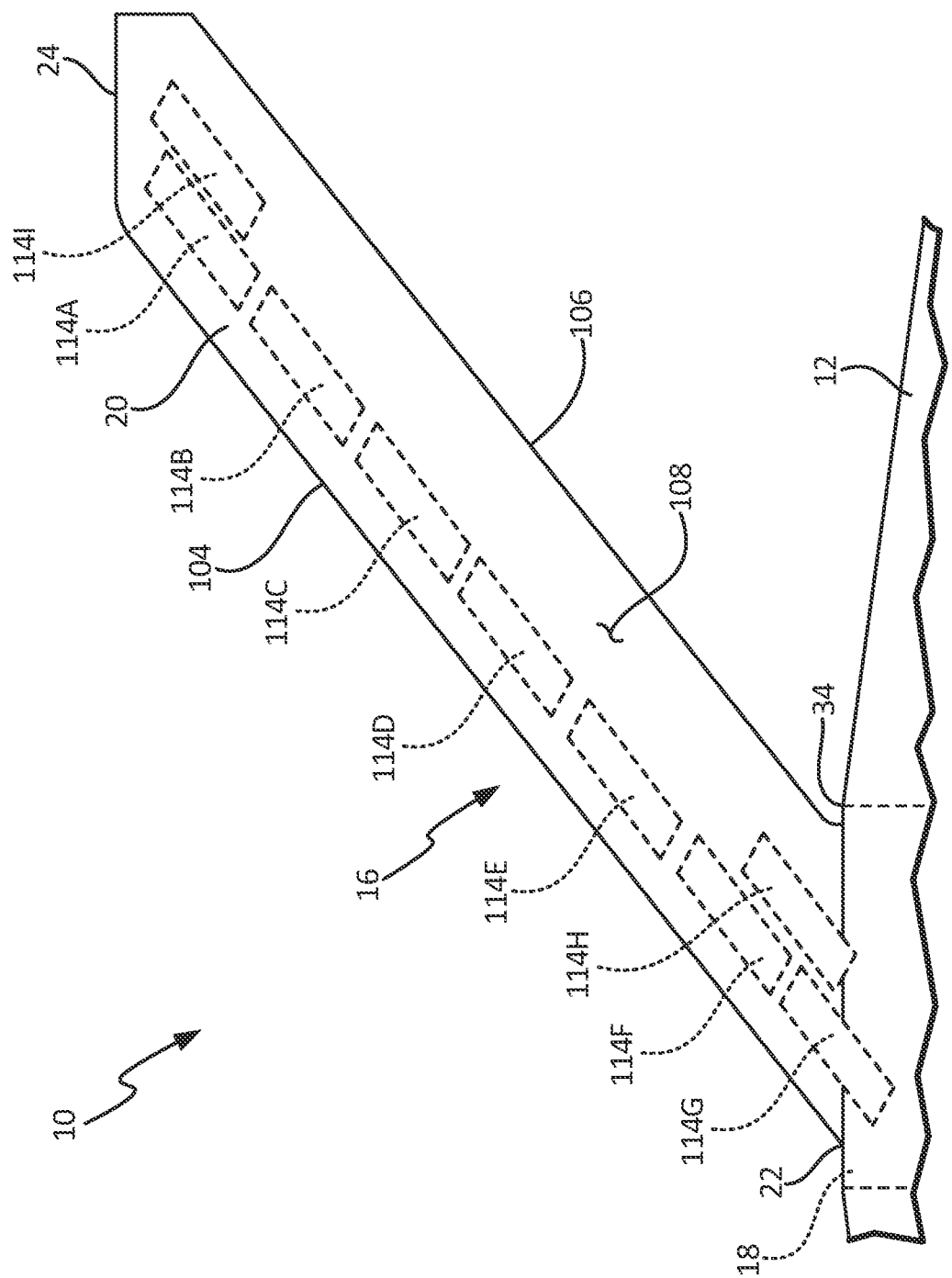

ANGLE OF ATTACK SENSOR WITH SLOPED FACEPLATE

BACKGROUND

The present disclosure relates generally to angle of attack sensors, and more particularly to angle of attack sensors that utilize a rotatable vane.

Modern aircraft often incorporate air data systems that calculate air data outputs based on measured parameters collected from various sensors positioned about the aircraft. For instance, many modern aircraft utilize angle of attack sensors having a rotatable vane that is used to determine the aircraft angle of attack (i.e., an angle between oncoming airflow or relative wind and a reference line of the aircraft, such as a chord of a wing of the aircraft). The angle of attack sensor is mounted to the aircraft such that the rotatable vane is exposed to oncoming airflow about the aircraft exterior. Aerodynamic forces acting on the rotatable vane cause the vane to align with the direction of the oncoming airflow (i.e., along a chord extending from a leading edge to a trailing edge of the vane). Rotational position of the vane is sensed and utilized to determine the aircraft angle of attack.

Hindrance of the free rotation of the angle of attack vane or interference with aerodynamic characteristics of the vane due to icing conditions can degrade the accuracy of angle of attack determinations derived from the rotational position of the vane. Accordingly, angle of attack sensors utilizing rotatable vanes typically include heating elements to prevent accretion of ice on the vane and faceplate. Such heating elements, however, may utilize a significant portion of an amount of electrical power allotted to the angle of attack sensor during operation of the aircraft (i.e., an electrical power budget of the angle of attack sensor). Accordingly, the amount of electrical power utilized by the heating elements during anti-icing and/or deicing operations is an important consideration in the design of such angle of attack sensors.

SUMMARY

An angle of attack sensor includes a housing having an open end and a closed end, a faceplate positioned on the open end of the housing, the faceplate comprising a periphery at an outer edge of the faceplate, a central opening, and an exterior surface extending from the periphery to the central opening, and a vane assembly extending through the central opening of the faceplate. The exterior surface of the faceplate has a sloped profile from the periphery to the central opening.

An angle of attack sensor includes a housing having an open end and a closed end, a faceplate positioned on the open end of the housing, the faceplate comprising a periphery at an outer edge of the faceplate, a central opening, and an exterior surface extending from the periphery to the central opening, and a vane assembly extending through the central opening of the faceplate. The exterior surface of the faceplate has a continuous incline from the periphery to the central opening.

An angle of attack sensor includes a housing having an open end and a closed end, a faceplate positioned on the open end of the housing, the faceplate comprising a periphery at an outer edge of the faceplate, a central opening, and an exterior surface extending from the periphery to the central opening, and a vane assembly extending through the central opening of the faceplate. The exterior surface of the faceplate slopes downward and outward from the central opening to the periphery.

BRIEF DESCRIPTION OF THE DRAWINGS

FIG. 2A is a sectional view of the faceplate of the angle of attack sensor.

FIG. 5A is a partial side view of the angle of attack sensor showing the vane having vane heating elements.

DETAILED DESCRIPTION

Figure 1A:
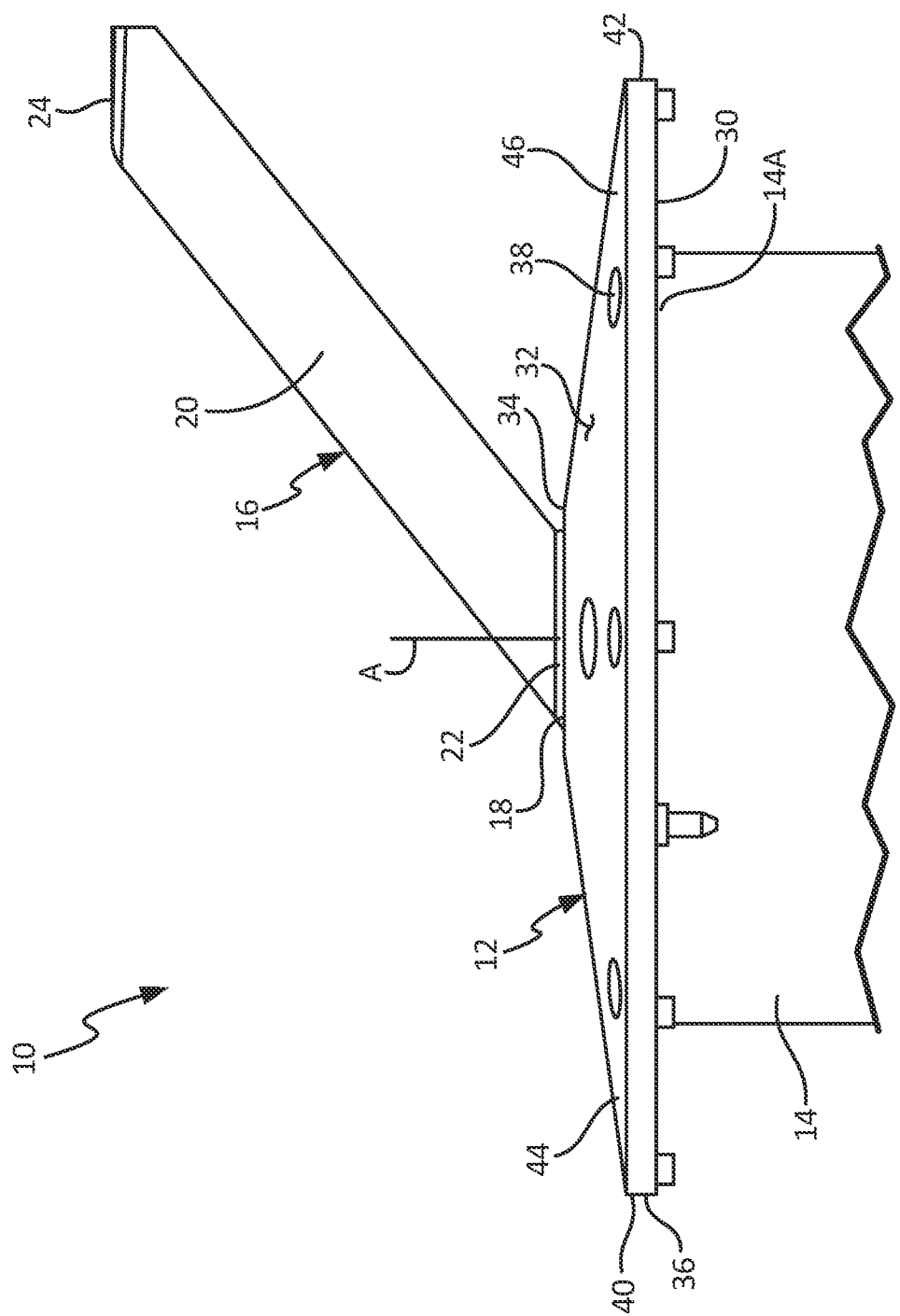
FIG. 1A is a partial side view of an angle of attack sensor with a frustoconical faceplate.
Figure 1B:
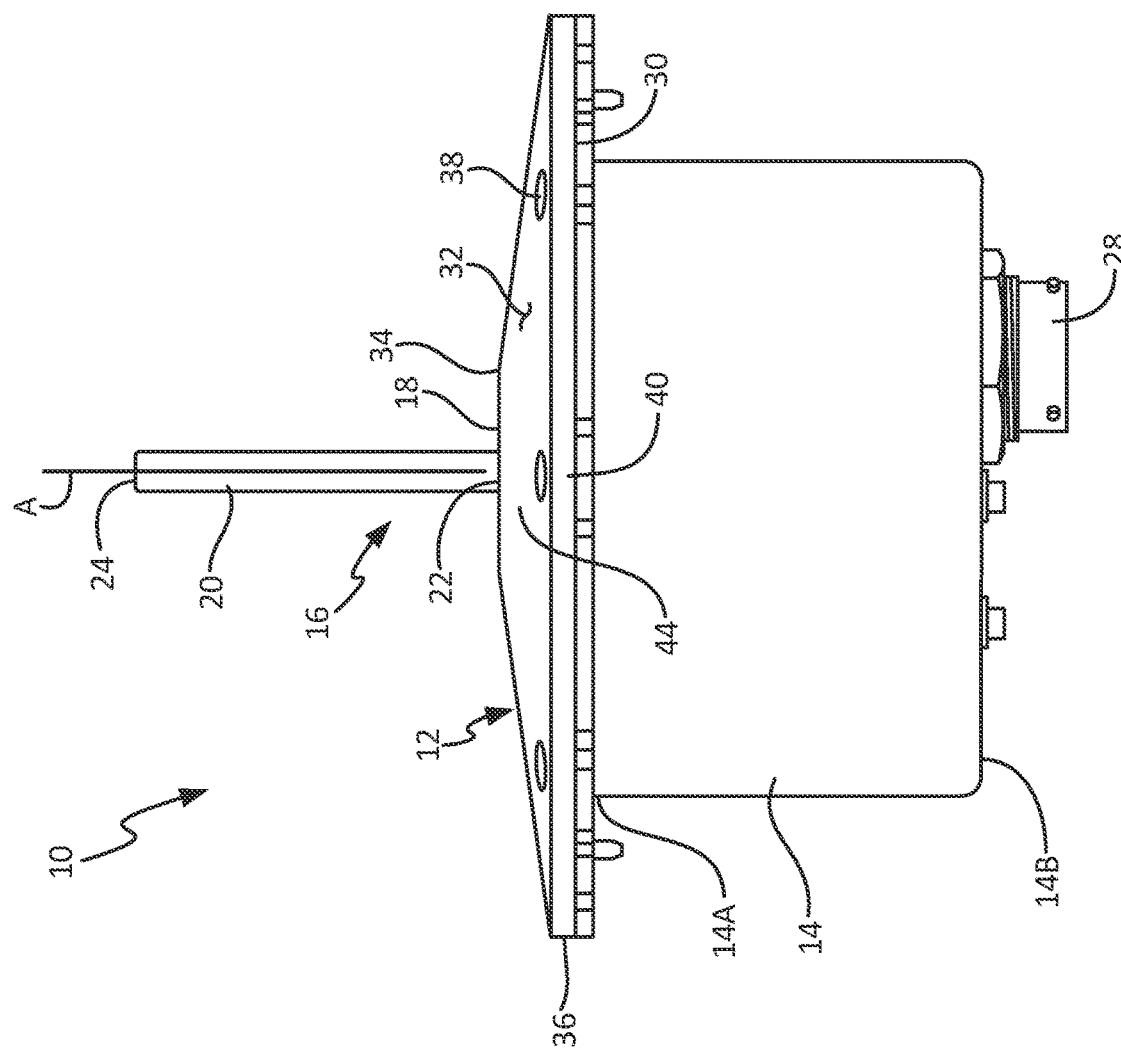
FIG. 1B is a front view of the angle of attack sensor.
Figure 1C:
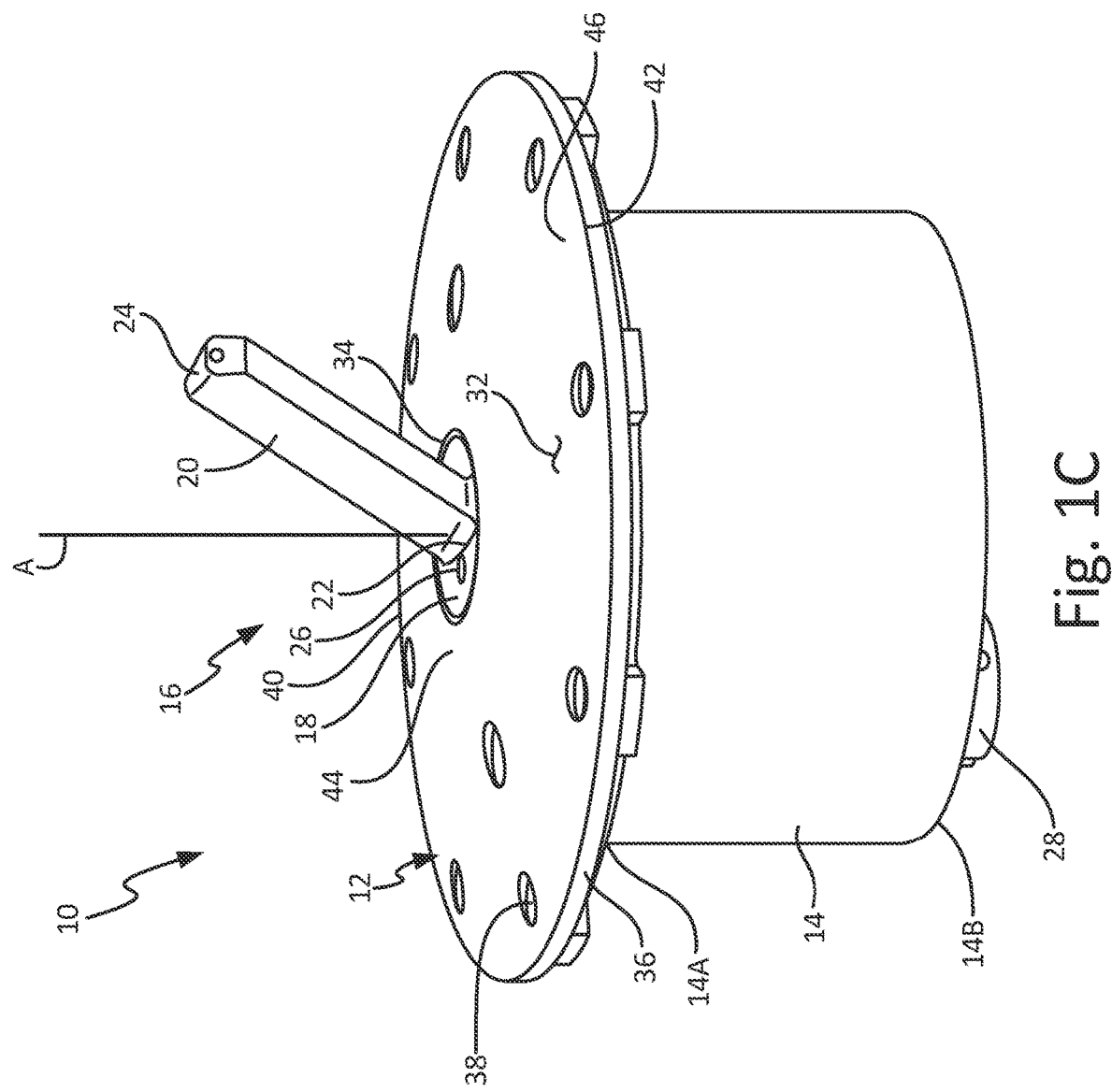
FIG. 1C is an isometric view of the angle of attack sensor.

Angle of Attack Sensor Faceplate Geometry (FIGS. 1A-1C)

FIG. 1A is a partial side view of angle of attack sensor 10 with frustoconical faceplate 12. FIG. 1B is a front view of angle of attack sensor 10. FIG. 1C is an isometric view of angle of attack sensor 10. FIGS. 1A, 1B, and 1C will be discussed together. Angle of attack sensor 10 includes faceplate 12, housing 14 (having first end 14A and second end 14B), vane assembly 16, which includes vane hub 18 and vane 20 (including root 22 and tip 24), vane shaft connectors 26, and electronics interface connector 28. Faceplate 12 includes interior surface 30, exterior surface 32, opening 34, periphery 36, mounting bores 38, leading edge 40, trailing edge 42, upstream portion 44, and downstream portion 46.

Single-piece faceplate 12 of angle of attack sensor 10 is a heated faceplate. A heater provides heat to faceplate 12, which is made of thermally conductive material. In this embodiment, faceplate 12 is metal, such as aluminum. In alternate embodiments, faceplate 12 may be any suitable thermally conductive material. Housing 14 is cylindrical with an annular sidewall between open first end 14A and closed second end 14B. Faceplate 12 is positioned on open first end 14A of housing 14. Vane assembly 16 is adjacent faceplate 12. Vane assembly 16 rotates about axis A. Vane assembly 16, which includes vane hub 18 and vane 20, has a portion that is positioned within faceplate 12 and extends through faceplate 12. More specifically, vane hub 18 is positioned in faceplate 12. Vane 20 has root 22 at a first end and tip 24 at a second end such that vane 20 extends from root 22 to tip 24. Tip 24 is opposite root 22. Root 22 of vane 20 is connected to vane hub 18. Root 22 can be integrally formed with vane hub 18, such that vane 20 is integral to vane hub 18 or otherwise attached to vane hub 18 (e.g., via welding, brazing, or other connection). Vane hub 18 receives vane shaft connectors 26. Vane shaft connectors 26 extend through vane hub 18. A first end of a rotatable vane shaft is connected to vane hub 18 via vane shaft connectors 26.

Electronics interface connector 28 extends from housing 14 into an interior of the aircraft. Electronics interface connector 28 can be configured to connect with an aircraft communications data bus, such as a data bus configured to communicate via the Aeronautical Radio, Incorporated (ARINC) 429 communications protocol or other communications protocols. In other examples, electronics interface connector 28 carries electrical signals (e.g., analog alternating current voltages) from a rotational position sensor positioned within housing 14 and configured to sense rotation of a shaft connected to vane assembly 16, as is further described below. In some examples, electronics interface connector 28 carries electrical power to angle of attack sensor 10 for use by heating elements included within vane 20 and/or faceplate 12 and/or electrical components included within housing 14. In other examples, angle of attack sensor 10 includes additional connectors (i.e., separate from electronics interface connector 28) configured to carry electrical power and/or additional electrical and/or communicative signals, though additional connectors need not be present in all examples.

Faceplate 12 has interior surface 30 facing toward housing 14, or toward an interior of angle of attack sensor 10. Exterior surface 32 of faceplate 12 is the surface opposite interior surface 30, or the surface of faceplate 12 that faces external airflow. At its center, faceplate 12 has circular opening 34, which extends from interior surface 30 to exterior surface 32. Vane assembly 16 extends through opening 34 of faceplate 12, or protrudes from faceplate 12 at opening 34. More specifically, vane hub 18 is positioned in opening 34. Opening 34 is concentric with periphery 36. In alternate embodiments, opening 34 may be non-concentric with periphery 36. Periphery 36 of faceplate 12 is the outermost part of faceplate 12. As such, periphery is the circular outer edge, or circumference, of faceplate 12. Faceplate 12 meets the aircraft skin at periphery 36. Exterior surface 32 of faceplate 12 extends from periphery 36 to central opening 32. Mounting bores 38 are located around periphery 36 of faceplate 12. Mounting bores 38 extend through faceplate 12 from interior surface 30 to exterior surface 32. In this embodiment, faceplate 12 has eight mounting bores 38. In alternate embodiments, faceplate may have any number of mounting bores 38. Leading edge 40 is a fore portion of periphery 36 of faceplate 12, and trailing edge 42 is an aft portion of periphery 36 of faceplate 12. Upstream portion 44 is a portion of faceplate 12 that is upstream with respect to oncoming airflow when angle of attack sensor 10 is installed on an aircraft. Upstream portion 44 is upstream of vane assembly 16. Downstream portion 46 is a portion of faceplate 12 that is downstream from upstream portion 44 (and downstream with respect to oncoming airflow) when angle of attack sensor 10 is installed on an aircraft. Downstream portion 46 is adjacent upstream portion 44. Downstream portion 46 is downstream of vane assembly 16.

Exterior surface 32 of faceplate 12 continuously inclines, or has a sloped profile, from periphery 36 to opening 34 such that a height of faceplate 12 at opening 34 is greater than the height of faceplate 12 at periphery 36. Faceplate 12 progressively increases in height from periphery 36 to opening 34. As such, faceplate 12 surrounds vane hub 18 and exterior surface 32 of faceplate 12 slopes downward and outward from opening 34 to periphery 36. Thus, an exterior surface of vane hub 18 and root 22 of vane 20 are above the skin of the aircraft. In this embodiment, the sloped profile, or continuous incline, of faceplate 12 is axisymmetric and has the same axis A as vane assembly 16. In alternate embodiments, the sloped profile, or continuous incline, of faceplate 12 may be non-axisymmetric and/or have a different axis than axis A of vane assembly 16. In this embodiment, faceplate 12 has a frustoconical exterior surface 32. In alternate embodiments, faceplate 12 may have an exterior surface 32 that is ellipsoidal, hemispherical, trapezoidal, another convex shape, or any other suitable shape. In further alternate embodiments, exterior surface 32 of faceplate 12 may have exterior surface 32 with a continuous incline, or a sloped profile, only at upstream portion 44 such that faceplate 12 has sloped upstream portion 44 and flat downstream portion 46.

Angle of attack sensors 10 are installed on the exterior of an aircraft and mounted to the aircraft via fasteners, such as screws or bolts, which interface with mounting bores 38 on faceplate 12. As a result, periphery 36 of faceplate 12 is about flush with the skin of the aircraft, and housing 14 extends within an interior of the aircraft. Vane 20 extends outside an exterior of the aircraft and is exposed to oncoming airflow, causing vane 20 and vane hub 18 of vane assembly 16 to rotate with respect to faceplate 12 via a series of bearings within angle of attack sensor 10. Vane assembly 16 rotates based on the angle the aircraft is flying at relative to the oncoming airflow. More specifically, vane 20 rotates to be parallel with, or align with, oncoming airflow. Vane 20 causes vane hub 18 to rotate. Rotation of vane hub 18 causes rotation of a vane shaft, which is within housing 14 and coupled to a rotational sensor that measures the local angle of attack or angle of the airflow relative to the fixed aircraft structure. The angle of attack measurement is communicated to an aircraft flight computer via electronics interface connector 28.

When the aircraft is in flight, faceplate 12 is exposed to external airflow, which is cold and often contains water droplets or ice particles. Periphery 36 of faceplate 12 is also adjacent the aircraft skin, which is below freezing. Heated faceplate 12 conducts heat to the rotating components of angle of attack sensor 10, such as vane assembly 16. Ice particles from oncoming airflow directly impinge on heated exterior surface 32 of faceplate 12 and melt or bounce off faceplate 12. Faceplate 12 eliminates icing that can result from both direct impingement and runback of the melted ice particles or liquid water.

A first failure mode avoided by angle of attack sensor 10 is runback icing, where liquid water or ice that has melted on a heated faceplate runs back to a colder surface of the faceplate, refreezes, and grows into a large ice horn that impacts angle of attack measurement. A second failure mode avoided by angle of attack sensor 10 is step icing, or ice growth at the interface between the faceplate and the aircraft skin.

The continuous incline of exterior surface 32 of faceplate 12 allows ice and water to shed from faceplate 12, redirecting the melted ice particles or liquid water to eliminate runback.

The frustoconical shape of faceplate 12 also causes a static pressure bulge, or an increase in static pressure on leading edge 40 of faceplate 12. As a result, incoming water droplets are diverted to the sides of faceplate 12 and vane 20, creating a shadowing effect aft of vane 20 at trailing edge 42 of faceplate 12 where periphery 36 meets the aircraft skin. Ice is prevented from accumulating aft of vane 20 where any step, or height difference, between faceplate 12 and the aircraft skin would otherwise result in ice growth.

Additionally, the frustoconical shape of faceplate 12 causes flow separation at downstream portion 46 of faceplate 12, or a trailing eddy. As such, any water droplets from downstream portion 46 are wicked away, preventing water droplets from freezing and accumulating into ice growths.

Further, the slope of exterior surface 32 of faceplate 12 causes faceplate 12 to project into the airstream, which shields downstream portion 46 of faceplate 12 from being directly hit by water droplets. Because an exterior surface of vane hub 18 is not flush with an entirety of exterior surface 32 of faceplate 12 and is above the skin of the aircraft, incoming water droplets are more likely to continue downstream than accrete on vane hub 18, which is farther off the boundary layer, diminishing the impact of any ice build-up.

On heated faceplates having a flat outer surface, impinging water runback can refreeze and form ice growths on the colder downstream portion of the faceplate. The ice accumulation forms a shape behind the vane that becomes large enough to disrupt airflow and cause errors in measurements of the angle of attack sensor. Additionally, impinging water runback can freeze and accumulate at the interface between the faceplate and the aircraft skin, which is not heated. Such step icing affects the accuracy of the angle of attack sensor measurements. Faceplate 12 mitigates both (1) ice accumulation on downstream portion 46 of faceplate 12 aft of vane 20 and (2) ice accumulation at the interface of faceplate 12 and the aircraft skin.

Figure 2B:
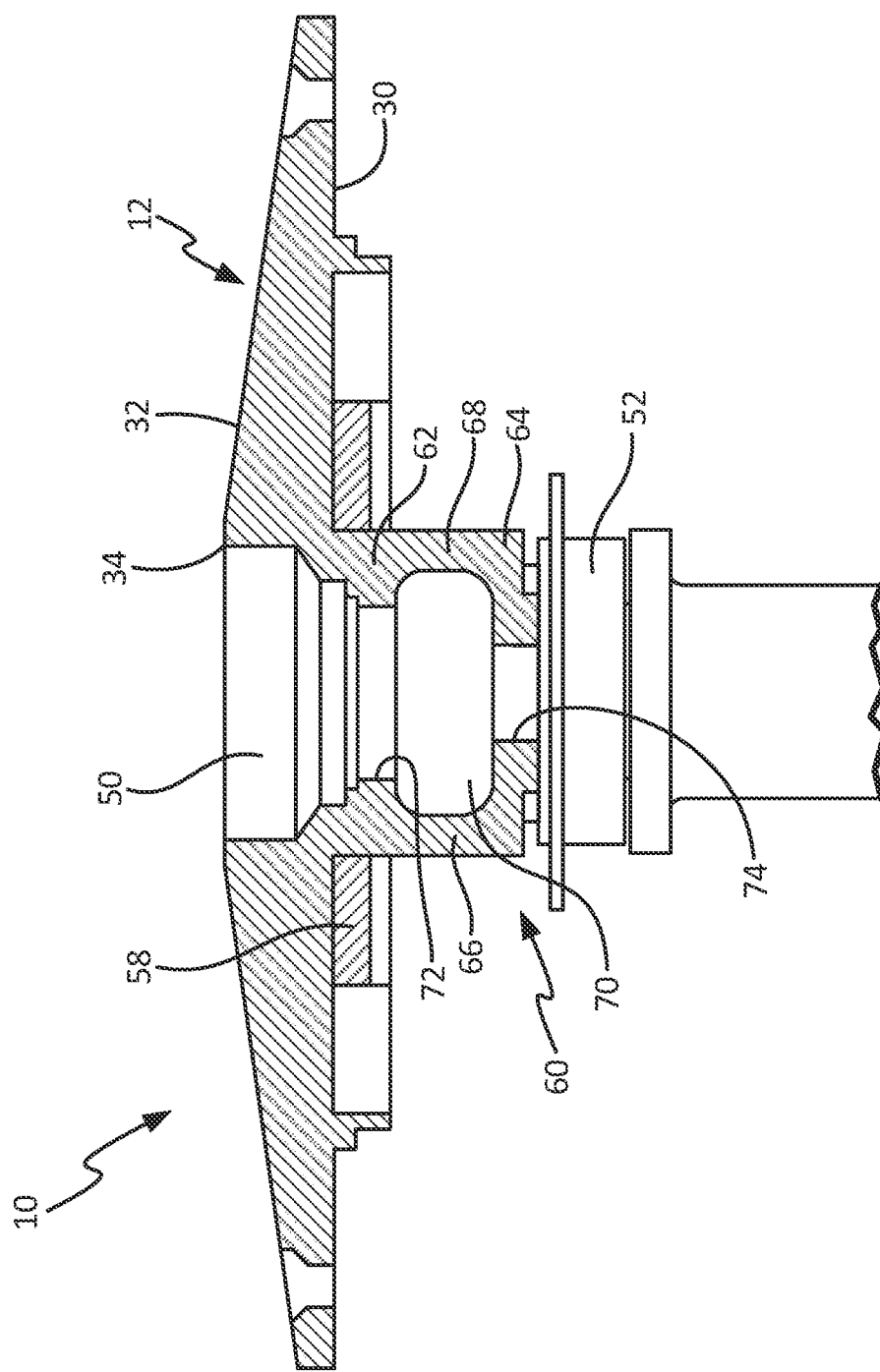
FIG. 2B is a sectional view of the angle of attack sensor showing the faceplate having a faceplate heater and showing the bearing support cage.
Figure 2C:
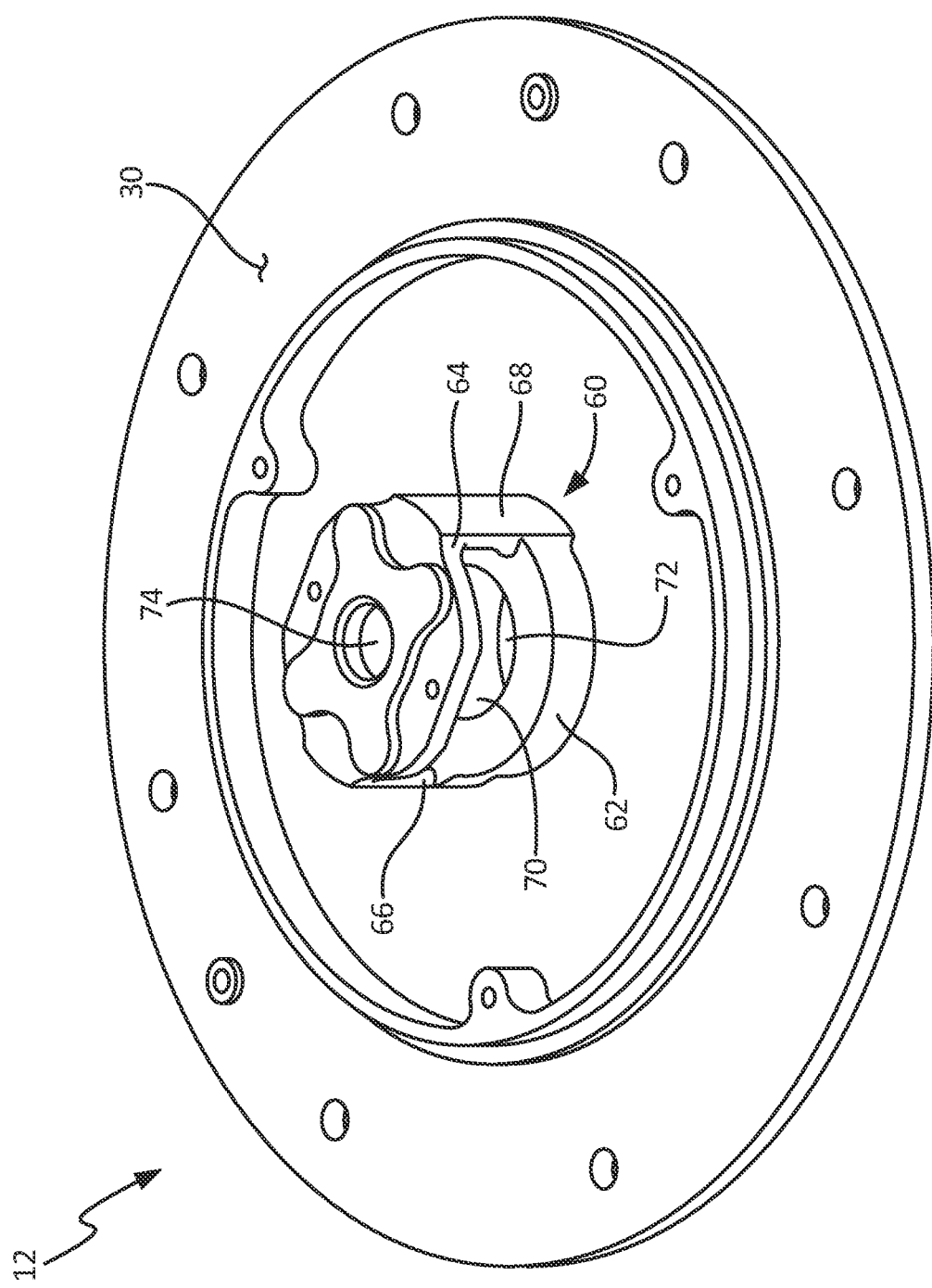
FIG. 2C is an isometric bottom view of the faceplate.

Angle of Attack Sensor Bearing Cage (FIGS. 2A-2C)

FIG. 2A is a sectional view of faceplate 12 of angle of attack sensor 10. FIG. 2B is a sectional view of angle of attack sensor 10 showing faceplate 12 having faceplate heater 58 and showing bearing support cage 60. FIG. 2C is an isometric bottom view of faceplate 12. FIGS. 2A, 2B, and 2C will be discussed together. Angle of attack sensor 10 includes faceplate 12, vane assembly 16 (shown in FIG. 2A), which includes vane hub 18 and vane 20, vane shaft 48 (shown in FIG. 2A), rotating interface cavity 50, rotational position sensor 52 (shown in FIG. 2B), outer bearing 54 (shown in FIG. 2A), inner bearing 56 (shown in FIG. 2A), and faceplate heater 58 (shown in FIG. 2B). Faceplate 12 includes interior surface 30, exterior surface 32, opening 34, and bearing support cage 60, which includes outer support 62, inner support 64, supporting leg 66, supporting leg 68, support cavity 70, outer bearing bore 72, and inner bearing bore 74.

Angle of attack sensor 10 has the same structure and function as described with respect to FIGS. 1A, 1B, and 1C. A first end of rotatable vane shaft 48 is connected to vane hub 18 via vane shaft connectors 26 (shown in FIG. 1C). More specifically, vane shaft connectors 26 extend through vane hub 18 to connect vane hub 18 to vane shaft 48. Vane shaft 48 is rotatable about axis A (shown in FIG. 2A). Vane 20, vane hub 18, and vane shaft 48 are configured to rotate together. Vane hub 18 is positioned in rotating interface cavity 50, which is a space within opening 34 of faceplate 12. Rotating interface cavity 50 extends from exterior surface 32 of faceplate 12. A first end of vane shaft 48 extends through rotating interface cavity 50. A second end of vane shaft 48 extends into housing 14 (shown in FIGS. 1A-1C). Rotational position sensor 52 is connected to the second end of vane shaft 48 via a resolver shaft. In one embodiment, rotational position sensor 52 is a resolver that senses rotational position of vane shaft 48. Rotational position sensor 52 is positioned within housing 14. In alternate embodiments, rotational position sensor 52 may be an encoder, synchro, linear transformer, rotary variable differential transformer (RVDT), potentiometer, or any other suitable sensor that can sense relative (i.e., incremental) and/or absolute angular position of vane shaft 48. Vane shaft 48 extends through outer bearing 54 and into inner bearing 56. Outer bearing 54 is adjacent rotating interface cavity 50. The second end of vane shaft 48 is within inner bearing 56. Faceplate heater 58 is positioned on an inner surface of, or embedded in, faceplate 12. Faceplate heater 58 may comprise a plurality of heater chips, heater rings, or any other suitable heating elements. Faceplate heater 58 extends around vane assembly 16. Faceplate heater 58 is a self-regulating heater.

Bearing support cage 60 is an integral part of faceplate 12. Bearing support cage 60 is an inner central portion of faceplate 12 that extends into housing 14. Bearing support cage 60 has outer support 62 adjacent opening 34 and rotating interface cavity 50 and inner support 64 adjacent rotational position sensor 52. Supporting leg 66 extends from outer support 62 to inner support 64. Supporting leg 68 extends from outer support 62 to inner support 64 opposite supporting leg 66. Support cavity 70 is a space between outer support 62 and inner support 64 and between supporting leg 66 and supporting leg 68. Outer bearing bore 72 is an opening that extends through outer support 62 and is configured to accept outer bearing 54. Inner bearing bore 74 is an opening that extends through inner support 64 and is configured to accept inner bearing 56. Outer bearing bore 72 and inner bearing bore 74 are axially aligned. Outer bearing bore 72 and inner bearing bore 74 are machined from the same axis on the same machine without moving faceplate 12 so that misalignment of outer bearing bore 72 and inner bearing bore 74 is avoided. Outer bearing bore 72 and inner bearing bore 74 are cut in the same orientation from a single piece of metal, such as aluminum, via a CNC machining process. Rotating interface cavity 50 is also machined at the same time and along the same axis as outer bearing bore 72 and inner bearing bore 74. A complex undercut geometry forms support cavity 70.

Rotational position sensor 52 is connected to vane shaft 48 and measures angular rotation of vane shaft 48 and vane assembly 16 to determine the local angle of attack. Faceplate heater 58 provides heat to faceplate 12 near rotating vane assembly 16 and vane shaft 48. Outer support 62 supports, or holds, outer bearing 54, and inner support 64 supports, or holds, inner bearing 56. Vane shaft 48 extends from rotating interface cavity 50, through outer bearing bore 72, through support cavity 70, and into inner bearing bore 74. Support cavity 70 provides space for a counterweight (not shown) connected to vane shaft 48 and heater wires (not shown) to freely rotate unobstructed between outer support 62 and inner support 64.

Bearing support cage 60 has outer bearing bore 72 and inner bearing bore 74 that are machined from a single piece of metal, such as aluminum, on the same machine without repositioning faceplate 12 so that both boring procedures are performed on the same axis. As a result, precise alignment between outer bearing 54 and inner bearing 56 on single-piece monolithic faceplate 12 is achieved. As such, bearing support cage 60 ensures bearing alignment, which is critical because of the short length of vane shaft 48 and thus short distance between outer bearing 54 and inner bearing 56.

Further, bearing support cage 60 provides a direct thermal conduction path from faceplate heater 58 to rotational position sensor 52. Heat is routed from faceplate heater 58 to rotational position sensor 52 via direct conduction through bearing support cage 60, with no other thermal interfaces. Heat conduction is tailored such that only the necessary amount of heat is bled from the faceplate heater 58 through bearing support cage 60 to rotational position sensor 52, minimizing the amount of power used by faceplate heater 58. Tailoring heat conduction results in less heat being lost to the cold oncoming airflow.

Traditionally, a series of parts stack up to create the structure to hold the outer bearing and the inner bearing. As angle of attack sensors are mounted in locations where aircraft interior compartments are relatively small, the overall length of the angle of attack sensor from the interior surface of the faceplate to the electrical interface connector must be kept to a minimum. Therefore, the vane shaft of the angle of attack sensor is short in length, requiring a stack up of multiple parts over a short distance. This stack up creates a series of tolerances that may compound to result in misalignment between the outer bearing and the inner bearing. Bearing misalignment can cause higher friction and spring-back that result in reduced overall performance (sensitivity and accuracy) of the angle of attack sensor. Misalignment is very difficult to correct and in some instances parts or complete assemblies are scrapped due to the inability to achieve stated performance.

Near perfect alignment (less than 0.001 inch, or 0.0254 millimeters, center to center relative tolerance) between outer bearing 54 and inner bearing 56 is achieved via bearing support cage 60, eliminating any risk of shaft bending due to misalignment and keeping friction to a minimum, which results in improved unit accuracy and sensitivity.

Further, traditional angle of attack sensors sometimes include specific heaters for heating the rotational position sensor. However, with modern icing requirements, the heaters have been redeployed as faceplate heaters, leaving the rotational position sensors less temperature controlled than in the past. Due to the complexity of heater architectures and the need to identify heater malfunction, simply adding another heater is less desirable. Additionally, angle of attack sensor 10 is cold prior to flight and must be fully operational typically within a short amount of time after power-on, resulting in a short warm up time for rotational position sensor 52.

A direct conduction path from faceplate heater 58 to rotational position sensor 52 allows heating of rotational position sensor 52 within the required warm up time without requiring a tertiary heater, or an additional heater specifically for heating rotational position sensor 52, which requires additional power, reduces overall reliability, and is less cost-effective. The single-piece design of faceplate 12 also reduces parasitic losses. As a result, more power from the limited overall power budget of angle of attack sensor 10 can be used to reduce icing and ensure performance of angle of attack sensor 10 in icing conditions.

As mechanical devices with varying coefficients of thermal expansion among components, angle of attack sensors are susceptible to operational temperature differences. As a result, it is difficult to achieve a common stated accuracy over the total temperature range of operation. Providing a direct thermal conduction path from faceplate heater 58 to rotational position sensor 52 allows angle of attack sensor 10 to utilize faceplate heater 58 positioned for anti-icing to reduce the operational temperature variation range of rotational position sensor 52 (for example, increasing the lower bound from −55 degrees Celsius to 0 degrees Celsius), allowing rotational position sensor 52 to achieve a tighter accuracy over the entire operational environmental envelope. By utilizing self-regulating heaters instead of fixed resistance heaters, there is no increase to the upper temperature limit.

Angle of Attack Sensor Faceplate Heating Pattern
(FIGS. 3A-4E)

Figure 3A:
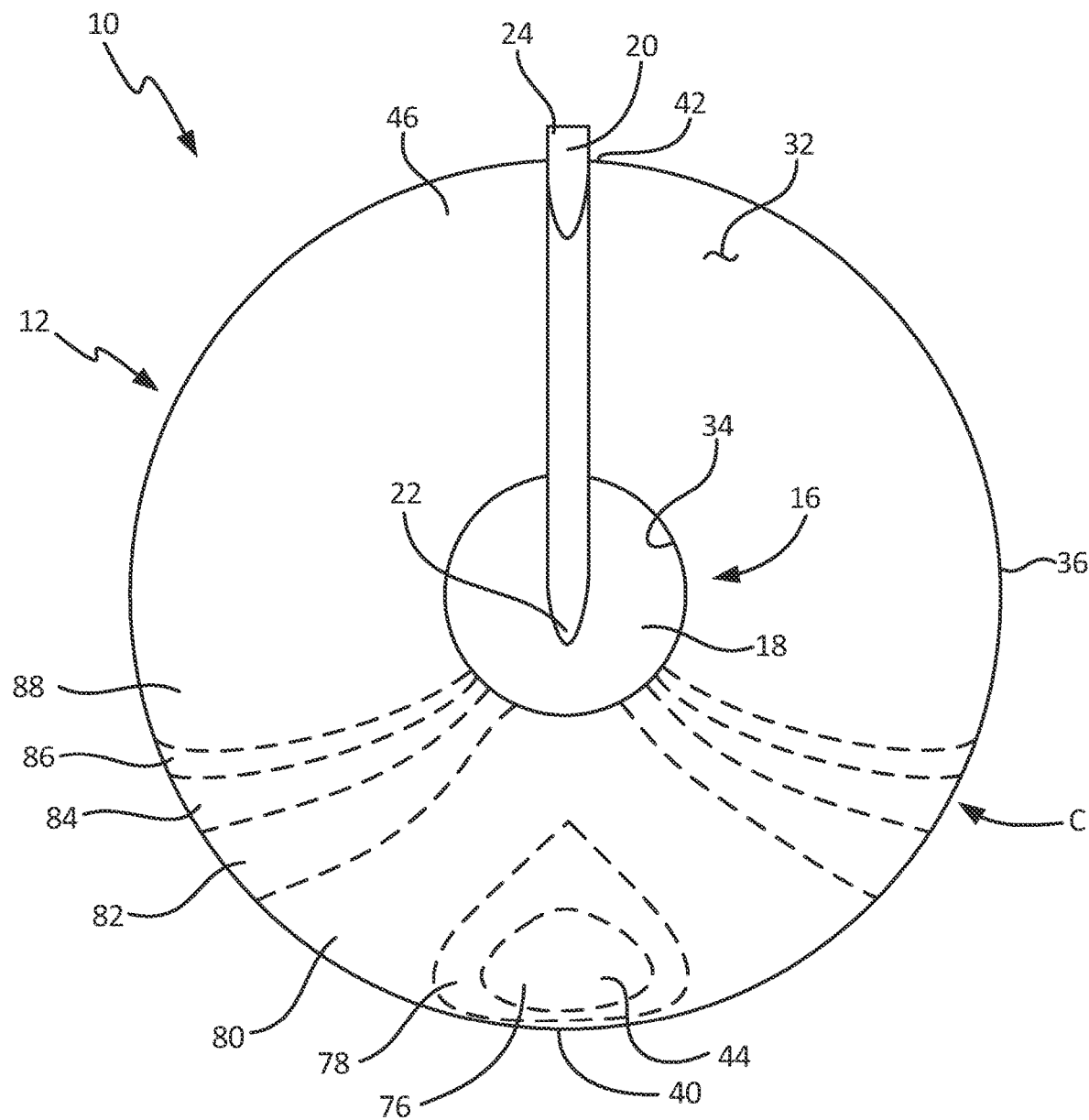
FIG. 3A is a top view of the angle of attack sensor showing a collection efficiency pattern of the faceplate.
Figure 3B:
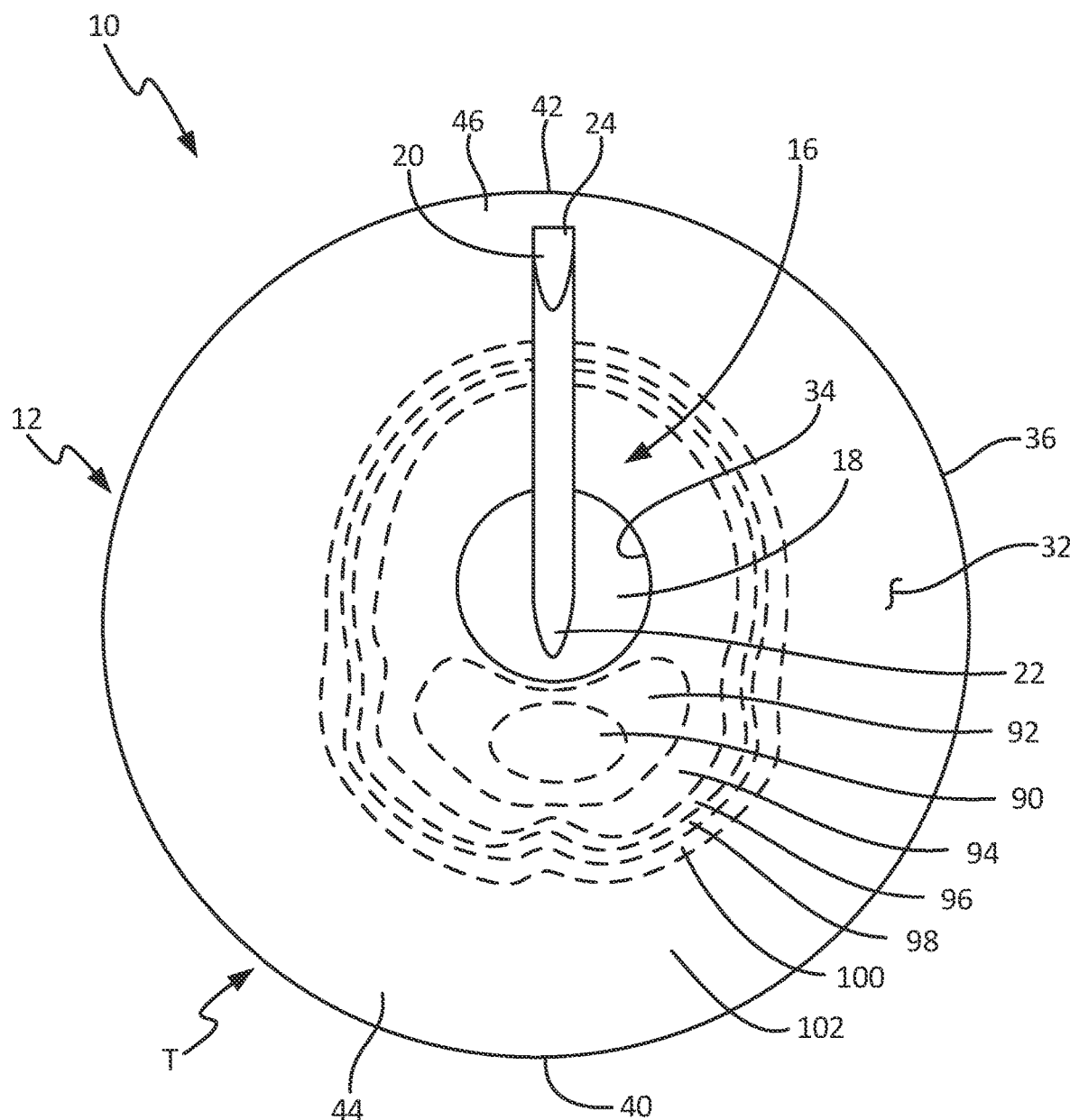
FIG. 3B is a top view of the angle of attack sensor showing the temperature profile of the faceplate heater.

FIG. 3A is a top view of angle of attack sensor 10 showing collection efficiency pattern C of faceplate 12. FIG. 3B is a top view of angle of attack sensor 10 showing temperature profile T of faceplate heater 58. FIGS. 3A and 3B will be discussed together. Angle of attack sensor 10 includes faceplate 12, vane assembly 16, which includes vane hub 18 and vane 20 (including root 22 and tip 24). Faceplate 12 includes exterior surface 32, opening 34, periphery 36, leading edge 40, trailing edge 42, upstream portion 44, and downstream portion 46. Collection efficiency pattern C includes first zone 76, second zone 78, third zone 80, fourth zone 82, fifth zone 84, sixth zone 86, and seventh zone 88. Temperature profile T includes first temperature zone 90, second temperature zone 92, third temperature zone 94, fourth temperature zone 96, fifth temperature zone 98, sixth temperature zone 100, and seventh temperature zone 102.

Figure 4A:
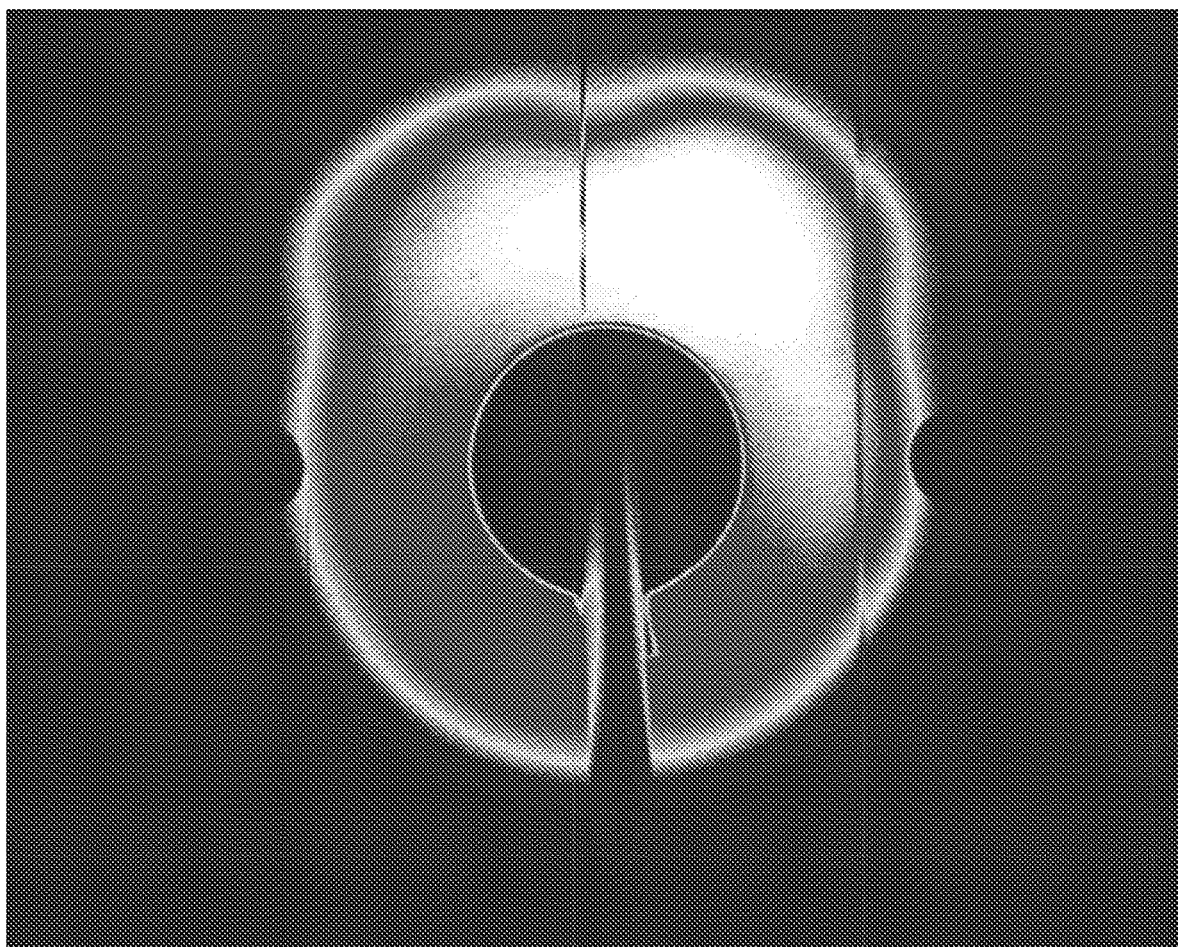
FIG. 4A is a photograph showing the temperature profile of the faceplate heater three seconds after start-up.

Angle of attack sensor 10 has the same structure and function as described with respect to FIGS. 1A-2C. As shown in FIG. 4A, frustoconical faceplate 12 has collection efficiency pattern C, which illustrates different zones that represent different areas of faceplate 12 with different collection efficiencies. A collection efficiency indicates the risk of ice growth on exterior surface 32 of faceplate 12 from ice crystals, water molecules, or other particles in the airflow traveling over faceplate 12. The shape, or sloped profile, of faceplate 12 determines collection efficiency pattern C of faceplate 12.

In this embodiment, collection efficiency pattern C of faceplate 12 has first zone 76, second zone 78, third zone 80, fourth zone 82, fifth zone 84, sixth zone 86, and seventh zone 88 that form a whale tail, or trapezoidal, shape on exterior surface 32 of faceplate 12. First zone 76 is at upstream portion 44 of faceplate 12 near leading edge 40. Second zone 78 surrounds first zone 76. Third zone 80 is adjacent second zone 78, having a strip on either side of second zone 78 that extends and expands from opening 34 to periphery 36. As such, third zone 80 diverges toward leading edge 40 of faceplate 12. Fourth zone 82 has two strips, each strip adjacent a strip of third zone 80 and extending and expanding from opening 34 to periphery 36. As such, fourth zone 82 diverges toward leading edge 40 of faceplate 12. Fifth zone 84 has two strips, each strip adjacent a strip of fourth zone 82 and extending and expanding from opening 34 to periphery 36. As such, fifth zone 84 diverges toward leading edge 40 of faceplate 12. Sixth zone 86 has two strips, each strip adjacent a strip of fifth zone 84 and extending and expanding from opening 34 to periphery 36. As such, sixth zone 86 diverges toward leading edge 40 of faceplate 12. First zone 76, second zone 78, third zone 80, fourth zone 82, fifth zone 84, and sixth zone 86 are all located at upstream portion 44 of faceplate 12, upstream of vane 20. Seventh zone 88 is adjacent both strips of sixth zone 86 and is located at downstream portion 46 of faceplate 12, including near trailing edge 42. First zone 76 is most likely to accumulate ice. Seventh zone 88 has the lowest propensity for ice growth. The likelihood of ice accumulation on faceplate 12 decreases from first zone 76 to seventh zone 88. In alternate embodiments, faceplate 12 may have a different shape, as indicated above with respect to FIGS. 1A-1C, and thus may have a different collection efficiency pattern C with different zones.

As shown in FIG. 3B, Temperature profile T illustrates the heating pattern generated by heating elements of faceplate heater 58 (shown in FIG. 2B) on an interior surface of, or embedded within, faceplate 12, which is derived from collection efficiency pattern C of faceplate 12. Temperature profile T of FIG. 3B illustrates the temperature profile of faceplate 12 within a few seconds of faceplate heater 58 being powered on. Faceplate heater 58 is comprised of multiple heating elements mounted on faceplate 12 and distributed asymmetrically around vane assembly 16 to address icing concerns. Faceplate heater 58 has heating elements arranged around vane hub 18 of vane assembly 16. Additional heating elements of faceplate heater 58 are also positioned upstream of vane assembly 16, toward upstream portion 44 and leading edge 40 of faceplate 12. Heating elements of faceplate heater 58 are placed around vane assembly 16 to achieve the heat distribution of temperature profile T on faceplate 12.

Temperature profile T has first temperature zone 90, second temperature zone 92, third temperature zone 94, fourth temperature zone 96, fifth temperature zone 98, sixth temperature zone 100, and seventh temperature zone 102 along exterior surface 32. First temperature zone 90 is at upstream portion 44 of faceplate 12 near a leading edge of vane hub 18. Second temperature zone 92 surrounds first temperature zone 90 at upstream portion 44. Third temperature zone 94 is adjacent second temperature zone 92 and surrounds vane hub 18. Fourth temperature zone 96 is adjacent and surrounds third temperature zone 94. Fifth temperature zone 98 is adjacent and surrounds fourth temperature zone 96. Sixth temperature zone 100 is adjacent and surrounds fifth temperature zone 98. Seventh temperature zone 102 is adjacent and surrounds sixth temperature zone 100. Seventh temperature zone 102 extends from sixth temperature zone 100 to periphery 36 of faceplate 12. As such, third temperature zone 94, fourth temperature zone 96, fifth temperature zone 98, sixth temperature zone 100, and seventh temperature zone 102 all surround vane hub 18.

First temperature zone 90 has the highest temperature among the zones. Temperature decreases from first temperature zone 90 to seventh temperature zone 102 or from opening 34 to periphery 36. Some heat conduction still occurs within seventh temperature zone 102. Temperatures within each of first temperature zone 90, second temperature zone 92, third temperature zone 94, fourth temperature zone 96, fifth temperature zone 98, sixth temperature zone 100, and seventh temperature zone 102 have some variation, with the amount of variation decreasing from first temperature zone 90 to seventh temperature zone 102.

As seen in FIG. 3A, faceplate 12 has a higher collection efficiency at upstream portion 44 near leading edge 40 of faceplate 12, indicating that ice or water particles are more likely to adhere to and form ice growths on leading edge 40 of conical exterior surface 32 of faceplate 12 than trailing edge 42 of faceplate 12. Temperature profile T is designed to address the icing concerns associated with collection efficiency pattern C. Because downstream portion 46 of faceplate 12, located in seventh zone 88, has a very low collection efficiency, less heat is needed at downstream portion 46 of faceplate 12, which is located in seventh temperature zone 102. As such, more power for heat is focused on upstream portion 44 of faceplate 12 than downstream portion 46 of faceplate 12, particularly near the leading edge of vane hub 18. Variation in collection efficiencies throughout collection efficiency pattern C on faceplate 12 results in an asymmetric layout of heating elements of faceplate heater 58 to direct heat only where needed and thus use power efficiently. As seen in FIG. 3B, faceplate heater 58 maintains heat around an entire circumference of rotating vane assembly 16, preventing water and ice particles from traveling beneath vane hub 18, freezing, and locking vane assembly 16. Faceplate heater 58 also has heating elements arranged to provide a higher concentration of heat to faceplate 12 upstream of vane assembly 16.

Faceplate heater 58 creates temperature profile T of frustoconical faceplate 12 based on collection efficiency pattern C of faceplate 12 to provide efficient heating of faceplate 12, and thus enable efficient use of power.

Figure 4B:
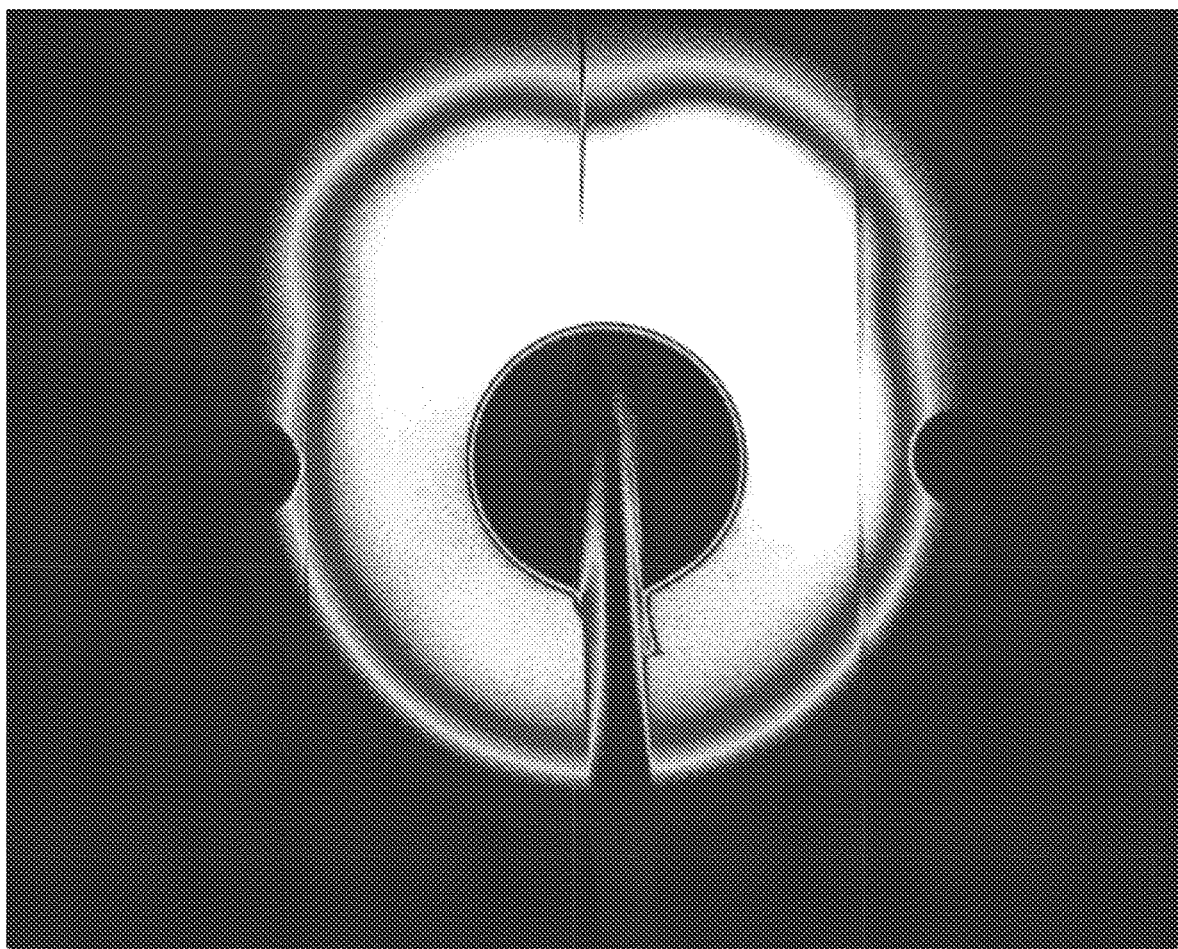
FIG. 4B is a photograph showing the temperature profile of the faceplate heater four seconds after start-up.
Figure 4C:
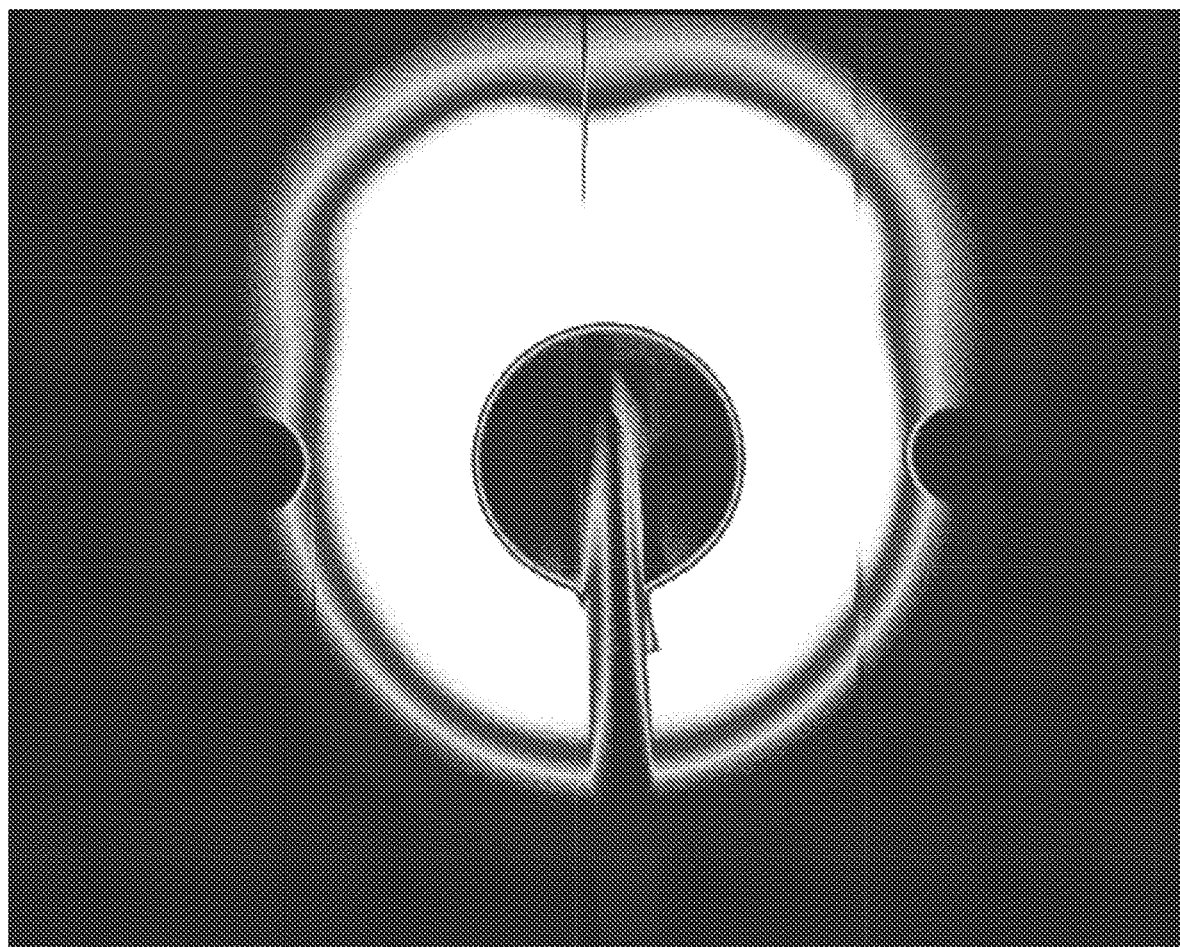
FIG. 4C is a photograph showing the temperature profile of the faceplate heater five seconds after start-up.
Figure 4D:
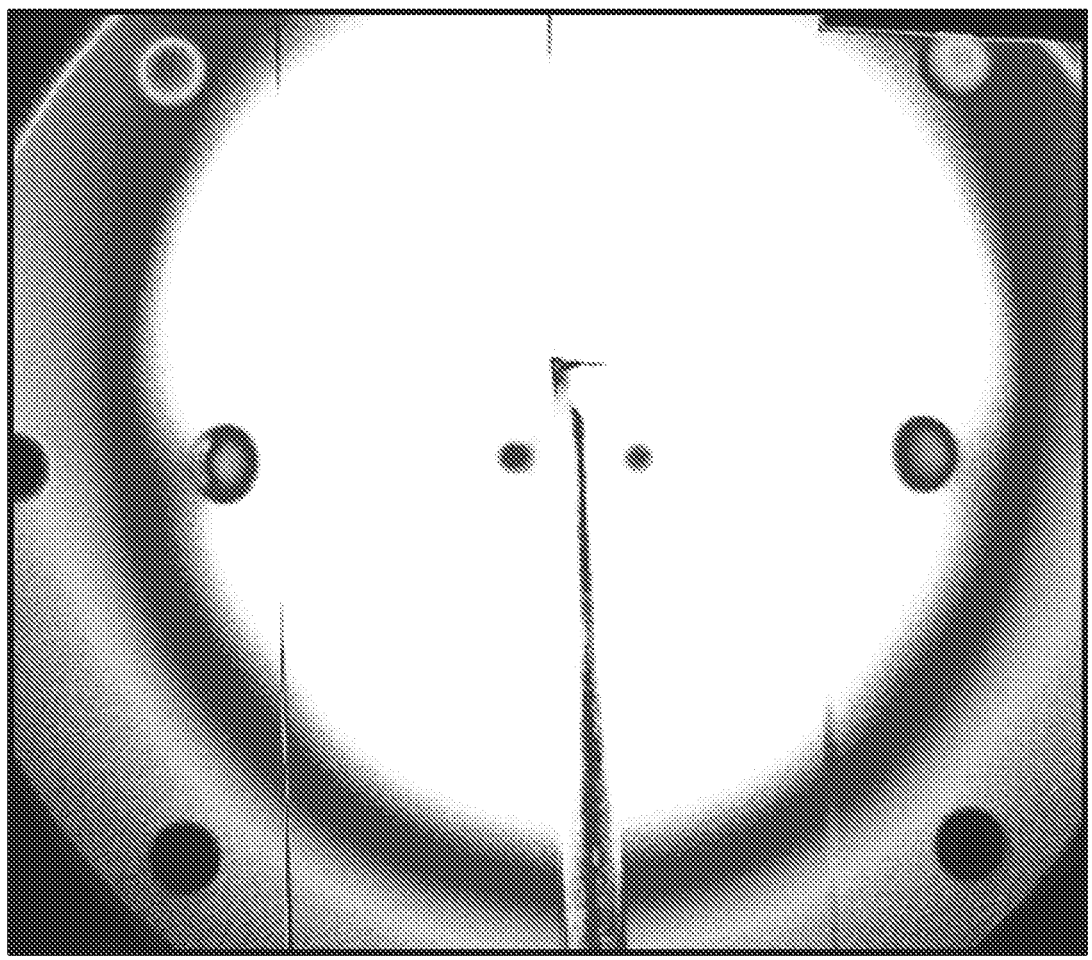
FIG. 4D is a photograph showing the temperature profile of the faceplate heater twenty seconds after start-up.
Figure 4E:
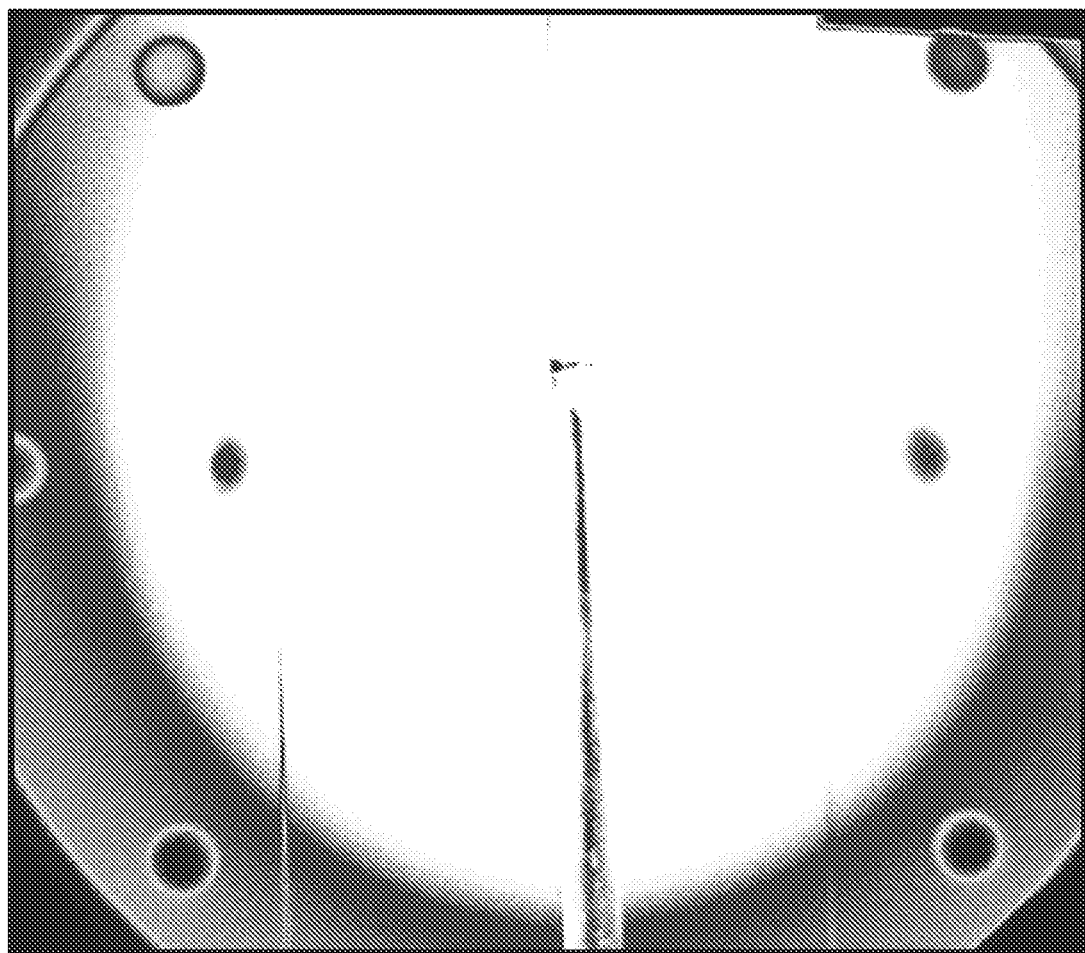
FIG. 4E is a photograph showing the temperature profile of the faceplate heater twenty-five seconds after start-up.

FIGS. 4A-4E are photographs showing the progression of temperature profiles illustrating the heating pattern generated by heating elements of faceplate heater 58 on faceplate 12 over time. FIGS. 4A-4E are a series of photographs taken from three seconds to twenty-five seconds after start-up showing the change in the heating pattern similar to that shown in FIG. 3B. FIG. 4A shows the temperature profile three seconds after start-up. FIG. 4B shows the temperature profile four seconds after start-up. FIG. 4C shows the temperature profile five seconds after start-up. FIG. 4D is shows the temperature profile twenty seconds after start-up. FIG. 4E shows the temperature profile twenty-five seconds after start-up. In FIGS. 4A-4E, the lighter the color, the higher the temperature. As illustrated in the photos of FIGS. 4A-4E, the heating pattern is growing and intensifying over a short amount of time after start-up, when power to the heating elements of faceplate heater 58 is turned on.

Figure 5B:
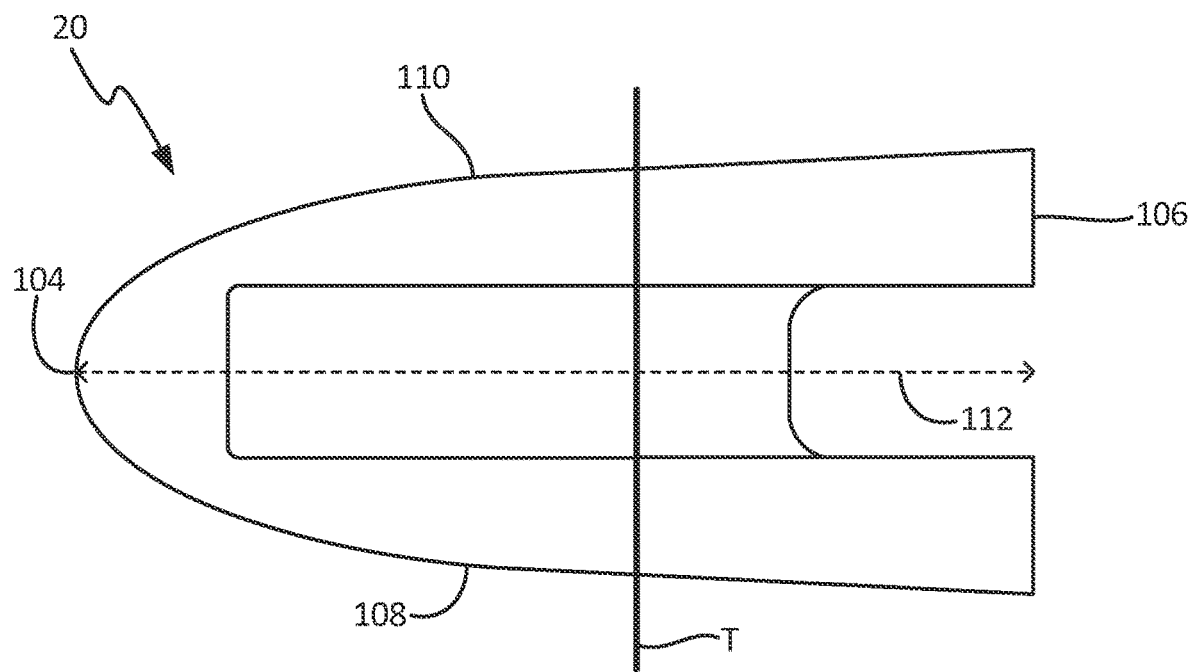
FIG. 5B is a sectional view of the vane showing a profile of the vane.

Angle of Attack Sensor Vane Profile (FIGS. 5A-5B)

FIG. 5A is a partial side view of angle of attack sensor 10 showing vane 20 having vane heating elements 114A-114I. FIG. 5B is a sectional view of vane 20 showing a profile of vane 20. FIGS. 5A and 5B will be discussed together. Angle of attack sensor 10 includes faceplate 12, vane assembly 16, which includes vane hub 18 and vane 20 (including root 22, tip 24, leading edge 104, trailing edge 106, first lateral face 108, second lateral face 110, and chord 112), and vane heating elements 114A-114I (shown in FIG. 4A). Faceplate 12 includes opening 34.

Angle of attack sensor 10 has the same structure and function as described with respect to FIGS. 1A-3B. Vane 20 has leading edge 104 extending from root 22 to tip 24 at an upstream portion of vane 20 and trailing edge 106 extending from root 22 to tip 24 at a downstream portion of vane 20, opposite leading edge 104. First lateral face 108 and second lateral face 110 of vane 20 each extend from leading edge 104 to trailing edge 106, second lateral face 110 being opposite first lateral face 108. First lateral face 108 and second lateral face 110 are symmetric about chord 112 that defines a symmetrical center between first lateral face 108 and second lateral face 110. Chord 112 of vane 20 extends in a direction from leading edge 104 to trailing edge 106 and bisects first lateral face 108 and second lateral face 110.

The outer surface profile of each of first lateral face 108 and second lateral face 110 is both nonlinear and geometrically convex from leading edge 104 to transition point T. As such, vane 20 has a symmetric NACA (National Advisory Committee for Aeronautics) profile from leading edge 104 to transition point T. Transition point T is at the tangent to the widest point of the symmetric geometrically convex outer surface profile, or NACA profile, of first lateral face 108 and second lateral face 110. Each of first lateral face 108 and second lateral face 110 extends or flares out from transition point T to trailing edge 106 so that vane has a diverging wedge shape from transition point T to trailing edge 106. The diverging wedge shape has an angle of up to 45 degrees, and preferably up to 25 degrees. As such, vane 20 has a wedge profile extending from the NACA profile. Thus, first lateral face 108 and second lateral face 110 each have a forward section with an outer surface profile that is nonlinear and geometrically convex from leading edge 104 to an intermediate chord location (transition point T) and an aft section with an outer surface profile that extends out to form a diverging wedge shape that extends from the intermediate chord location (transition point T) to trailing edge 106. First lateral face 108 and second lateral face 110 form a truncated symmetrical NACA profile and wedge-like profile. First lateral face 108 and second lateral face 110 of the wedge-like profile form an angle equal to or between 0 degrees (such that the wedge-like profile is parallel to the direction of airflow) and 45 degrees, and preferably between 0 degrees and 25 degrees. As shown in FIG. 5A, vane heating elements 114A-114I are disposed within vane 20 between first lateral face 108 and second lateral face 110 proximate leading edge 104 to provide heat to vane 20 for anti-icing and/or deicing operations. Vane heating elements 114A-114G each have a forward end disposed at a distance from leading edge 104 of vane 20 that is less than ten percent of a length of chord 112 of vane 20.

In this embodiment, vane 20 has nine separate heating elements (vane heating elements 114A-114I) extending from a location proximate root 22 to a location proximate tip 24. In alternate embodiments, vane 20 may include any number of heating elements. For example, vane 20 may include a single vane heating element disposed within vane 20 from a location proximate root 22 to a location proximate tip 24 to provide heat to vane 20 during anti-icing and/or deicing operations. Vane heating elements 114A-114I can be self-regulating heating elements (e.g., self-regulating chip heaters) or heating elements that are controlled via continuous or pulsed electrical current. In some examples, vane heating elements 114A-114I can be thermostatically controlled to achieve and/or maintain a target temperature. Electrical power for vane heating elements 114A-114I is provided by a power supply (e.g., received via an external power source) and routed through, e.g., vane shaft 48 (shown in FIG. 2A) and between first lateral face 108 and second lateral face 110 to vane heating elements 114A-114I.

In operation, air flowing over vane 20 in a direction from leading edge 104 to trailing edge 106 acts on first lateral face 108 and second lateral face 110 to cause vane 20 to rotate such that pressures experienced by first lateral face 108 and second lateral face 110 equalize and chord 112 aligns with a direction of the oncoming airflow. Rotation of vane 20 causes corresponding rotation of vane hub 18 and vane shaft 48. Rotational position sensor 52 measures the rotational position (e.g., relative and/or absolute rotational position) of vane shaft 48 and communicates the measured position signal to an external device, such as an air data computer, stall warning computer, data concentrator unit, aircraft display, or other external device via an electronic communication device within housing 14. Vane heating elements 114A-114I provide heat to vane 20 during operation to prevent accretion of ice on vane 20. An outer surface profile of each of first lateral face 108 and second lateral face 110 decreases an amount of heat dissipation from vane 20, thereby decreasing an amount of electrical current required by vane heating elements 114A-114I to provide sufficient heat to vane 20 for the anti-icing and/or deicing operations.

Vane 20 has a NACA profile extending downstream from leading edge 104 to a wedge-like profile extending from the NACA profile the trailing edge 106, the NACA and wedge profiles meeting at transition point T. The transition from the NACA profile to the wedge-like profile occurs at the point of maximum thickness of the symmetrical NACA profile of vane 20. Leading edge 104 having a NACA profile allows vane heating elements 114A-114I to be closer to the surface of leading edge 104, resulting in ice-free performance of vane 20. The wedge-like profile makes vane 20 more stable and accurate at high Mach speeds. The overall length of vane 20 (from leading edge 104 to trailing edge 106) is kept short, which results in less surface area to heat and thus ice-free performance.

Angle of attack sensors generally adopt a wedge profile that tapers to a sharper leading edge, which is inherently stable and offers high accuracy in flight conditions. However, that profile has proven difficult to certify to increasingly stringent icing conditions without also drawing excessive power as it is difficult to heat the leading edge of a traditional wedge design to keep it ice free across all icing conditions. A NACA vane profile has excellent icing performance, due to the NACA shape allowing vane heating elements to be installed in close proximity to the leading edge. However, it was discovered that this NACA profile can be unstable at High Mach numbers (0.9-1.0).

Vane 20 has a modified NACA profile to avoid flow separation and increase stability by adding material to form a wedge shape aft of the transition point T. As a result, vane 20 maintains an almost identical level of icing performance (ice-free) and is stable at High Mach numbers (0.9-1.0). Thus, this combination provides both optimal anti-icing performance and aerodynamic performance.

Figure 6:
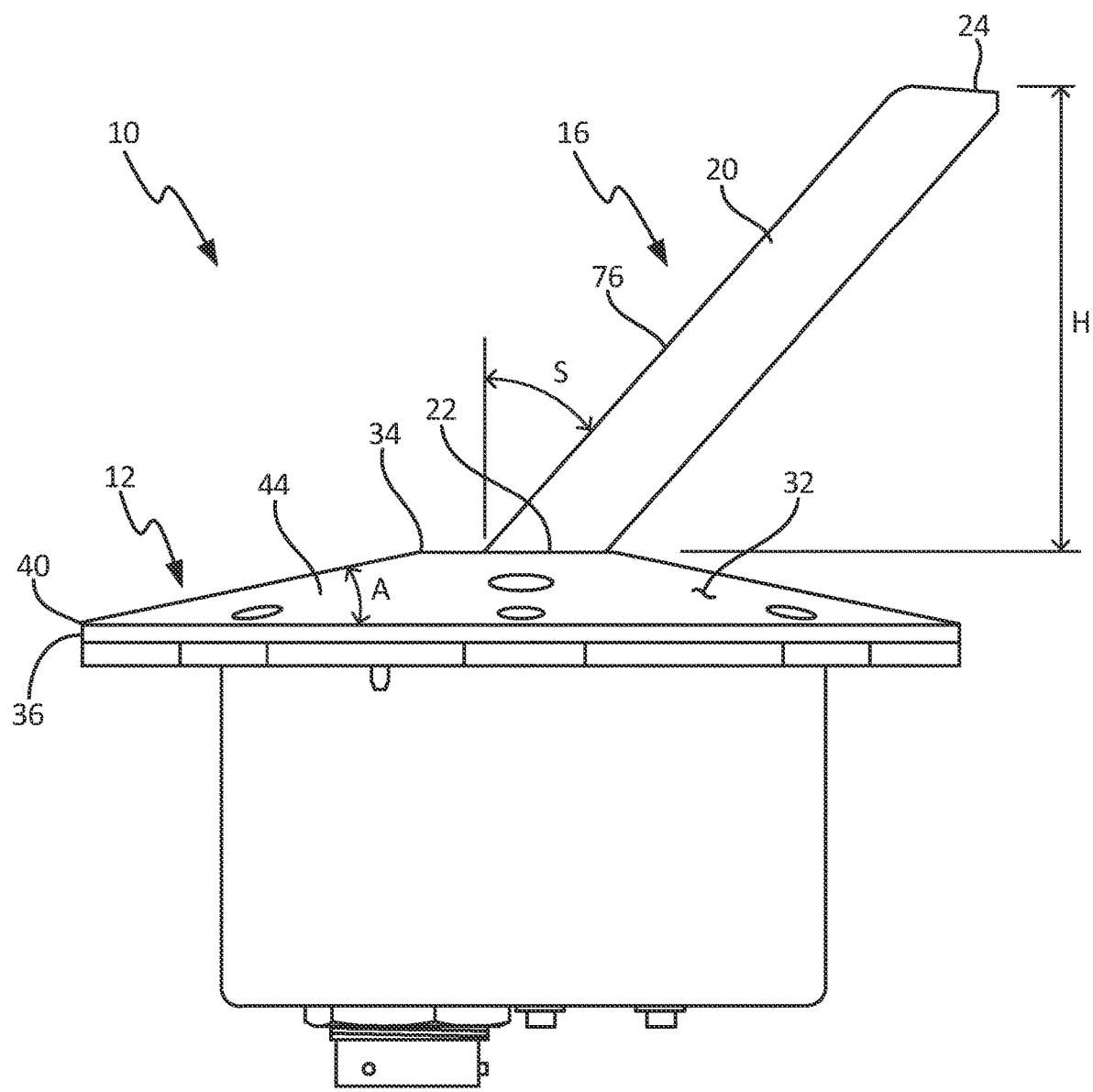
FIG. 6 is a side view of the angle of attack sensor showing a relationship of faceplate slope angle, vane sweep angle, and vane height.

Angle of Attack Sensor Interchangeability (FIG. 6)

FIG. 6 is a side view of angle of attack sensor 10 showing a relationship of faceplate slope angle A, vane sweep angle S, and vane height H. Angle of attack sensor 10 includes faceplate 12, vane assembly 16, which includes vane hub 18 and vane 20 (including root 22 and tip 24), and leading edge 76. Faceplate 12 includes exterior surface 32, opening 34, periphery 36, leading edge 40, upstream portion 44, and downstream portion 46.

Angle of attack sensor 10 has the same structure and function as described with respect to FIGS. 1A-5B. Faceplate slope angle A is the slope of exterior surface 32 of faceplate 12 from periphery 36 to opening 34. Faceplate slope angle A is equal to or between 6 degrees and 30 degrees, and is preferably equal to or between 6 degrees and 12 degrees. Faceplate slope angle A is great enough to have the ability to shed ice particles and/or water droplets and lower the risk of step icing at trailing edge 42 of faceplate 12 and low enough to not increase water droplet collection at leading edge 40 of faceplate 12, which would require additional power to remain ice free. Vane sweep angle S is the angle between leading edge 76 of vane 20 and a line perpendicular to vane hub 18. Vane sweep angle S is greater than zero. Vane 20 extends toward downstream portion 46 of faceplate 12 as a result of vane sweep angle S. Vane height H is the height of vane 20, or the distance between the horizontal of root 22 and the horizontal of tip 24. The greater the faceplate slope angle A, the shorter the vane height H. The shorter the vane height H, the greater the vane sweep angle S, in order to generate the required torque. In an example embodiment, faceplate slope angle A is 8 degrees, vane height H is 71 mm, and vane sweep angle S is 38 degrees. The distance from tip 24 of vane 20 to the skin of the aircraft is between 3.1 and 3.2 inches, and preferably 3.166 inches.

The effects of vane sweep angle S and vane height H, in addition to other aspects of vane shape, can be used to achieve interchangeability between vanes of different angle of attack sensors having various configurations. To ensure accuracy of angle of attack sensor 10, vane height H or the distance from the aircraft is critical. Vane heights H that are too long or too short impact the accuracy of angle of attack sensor 10 as a function from the aircraft skin. Each of vane sweep angle S, vane height H, and faceplate slope angle A can be varied to produce a vane that is interchangeable with different vanes of various angle of attack sensors. For example, vane sweep angle S can be modified while vane height H may remain at a predetermined value in order to achieve required sensitivity.

As part of normal aircraft certification, the angle of attack vane output is calibrated for local flow effects across the flight envelope. Those calibration tables are typically located within the ADIRUs (Air Data Inertial Reference Unit) onboard the aircraft and any change to those devices is extremely expensive and complicated. Previously, interchangeability design levers were not completely understood. Angle of attack configuration to configuration interchangeable performance is achieved through modifying vane height H and/or vane sweep angle S.

Discussion of Possible Embodiments

The following are non-exclusive descriptions of possible embodiments of the present invention.

An angle of attack sensor includes a housing having an open end and a closed end; a faceplate positioned on the open end of the housing, the faceplate comprising: a periphery at an outer edge of the faceplate; a central opening; and an exterior surface extending from the periphery to the central opening; and a vane assembly extending through the central opening of the faceplate; wherein the exterior surface of the faceplate has a sloped profile from the periphery to the central opening.

The angle of attack sensor of the preceding paragraph can optionally include, additionally and/or alternatively, any one or more of the following features, configurations and/or additional components:

The sloped profile of the faceplate has an axis and is axisymmetric, the axis of the sloped profile of the faceplate being the same as an axis of the vane assembly.

The faceplate has a frustoconical exterior surface.

A heater configured to provide heat to the faceplate.

The exterior surface of the faceplate has a sloped profile from the periphery to the central opening at the upstream portion of the faceplate.

The vane assembly includes a vane hub positioned in the central opening of the faceplate and a vane connected to the vane hub, an exterior surface of the vane hub and the vane being above the skin of the aircraft.

The exterior surface of the faceplate has a slope equal to or between 6 degrees and 30 degrees.

The exterior surface of the faceplate has a slope equal to or between 6 degrees and 12 degrees and a distance from a tip of the vane and a skin of an aircraft is between 3.1 and 3.2 inches.

The vane has a vane height of 71 mm and a vane sweep angle of 38 degrees and the faceplate has a slope of 8 degrees.

The faceplate has a sloped profile from the periphery to the central opening to create a shadowing effect aft of the vane assembly.

A height of the faceplate at the central opening is greater than a height of the faceplate at the periphery.

An angle of attack sensor includes a housing having an open end and a closed end; a faceplate positioned on the open end of the housing, the faceplate comprising: a periphery at an outer edge of the faceplate; a central opening; and an exterior surface extending from the periphery to the central opening; and a vane assembly extending through the central opening of the faceplate; wherein the exterior surface of the faceplate has a continuous incline from the periphery to the central opening.

The angle of attack sensor of the preceding paragraph can optionally include, additionally and/or alternatively, any one or more of the following features, configurations and/or additional components:

The faceplate has a frustoconical exterior surface.

A heater configured to provide heat to the faceplate.

The exterior surface of the faceplate continuously inclines from the periphery to the central opening at the upstream portion of the faceplate.

The vane assembly includes a vane hub positioned in the central opening of the faceplate and a vane connected to the vane hub, an exterior surface of the vane hub and the vane being above the skin of the aircraft.

The exterior surface of the faceplate has a continuous incline with a slope equal to or between 6 degrees and 30 degrees.

The exterior surface of the faceplate has a continuous incline with a slope equal to or between 6 degrees and 12 degrees and a distance from a tip of the vane and a skin of an aircraft is between 3.1 and 3.2 inches.

The vane has a vane height of 71 mm and a vane sweep angle of 38 degrees and the faceplate has a continuous incline with a slope of 8 degrees.

An angle of attack sensor includes a housing having an open end and a closed end; a faceplate positioned on the open end of the housing, the faceplate comprising: a periphery at an outer edge of the faceplate; a central opening; and an exterior surface extending from the periphery to the central opening; and a vane assembly extending through the central opening of the faceplate; wherein the exterior surface of the faceplate slopes downward and outward from the central opening to the periphery.

The angle of attack sensor of the preceding paragraph can optionally include, additionally and/or alternatively, any one or more of the following features, configurations and/or additional components:

The faceplate has a frustoconical exterior surface.

The vane assembly includes a vane hub positioned in the central opening of the faceplate and a vane connected to the vane hub, an exterior surface of the vane hub and the vane being above the skin of the aircraft.

The exterior surface of the faceplate has a slope equal to or between 6 degrees and 30 degrees.

The exterior surface of the faceplate has a slope equal to or between 6 degrees and 12 degrees and the distance from a tip of the vane and a skin of an aircraft is between 3.1 and 3.2 inches.

The vane has a height of 71 mm and a vane sweep angle of 38 degrees and the faceplate has a slope of 8 degrees.

The faceplate slopes downward and outward from the central opening to the periphery at the upstream portion of the faceplate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack sensor comprising:
a housing having an open end and a closed end;
a faceplate positioned on the open end of the housing, the faceplate comprising:
a periphery at an outer edge of the faceplate;
a central opening; and
an exterior surface extending from the periphery to the central opening; and
a vane assembly extending through the central opening of the faceplate;
wherein the exterior surface of the faceplate has a sloped profile from the periphery to the central opening;
wherein the exterior surface of the faceplate has a slope equal to or between 6 degrees and 30 degrees.

2. The angle of attack sensor of claim 1, wherein the sloped profile of the faceplate has an axis and is axisymmetric, the axis of the sloped profile of the faceplate being the same as an axis of the vane assembly.

3. The angle of attack sensor of claim 1, wherein the faceplate has a frustoconical exterior surface.

4. The angle of attack sensor of claim 1, further including a heater configured to provide heat to the faceplate.

5. The angle of attack sensor of claim 1, wherein the exterior surface of the faceplate has a sloped profile from the periphery to the central opening at the upstream portion of the faceplate.

6. The angle of attack sensor of claim 1, wherein the vane assembly includes a vane hub positioned in the central opening of the faceplate and a vane connected to the vane hub, an exterior surface of the vane hub and the vane being above the skin of the aircraft.

7. The angle of attack sensor of claim 6, wherein the exterior surface of the faceplate has a slope equal to or between 6 degrees and 12 degrees and a distance from a tip of the vane and a skin of an aircraft is between 3.1 and 3.2 inches.

8. The angle of attack sensor of claim 6, wherein the vane has a vane height of 71 mm and a vane sweep angle of 38 degrees and the faceplate has a slope of 8 degrees.

9. The angle of attack sensor of claim 1, wherein the faceplate has a sloped profile from the periphery to the central opening to create a shadowing effect aft of the vane assembly.

10. The angle of attack sensor of claim 1, wherein a height of the faceplate at the central opening is greater than a height of the faceplate at the periphery.

11. An angle of attack sensor comprising:
a housing having an open end and a closed end;
a faceplate positioned on the open end of the housing, the faceplate comprising:
a periphery at an outer edge of the faceplate;
a central opening; and
an exterior surface extending from the periphery to the central opening; and
a vane assembly extending through the central opening of the faceplate;
wherein the exterior surface of the faceplate has a continuous incline from the periphery to the central opening; and
wherein the exterior surface of the faceplate has a continuous incline with a slope equal to or between 6 degrees and 30 degrees.

12. The angle of attack sensor of claim 11, wherein the faceplate has a frustoconical exterior surface.

13. The angle of attack sensor of claim 11, further including a heater configured to provide heat to the faceplate.

14. The angle of attack sensor of claim 11, wherein the exterior surface of the faceplate continuously inclines from the periphery to the central opening at the upstream portion of the faceplate.

15. The angle of attack sensor of claim 11, wherein the vane assembly includes a vane hub positioned in the central opening of the faceplate and a vane connected to the vane hub, an exterior surface of the vane hub and the vane being above the skin of the aircraft.

16. The angle of attack sensor of claim 15, wherein the exterior surface of the faceplate has a continuous incline with a slope equal to or between 6 degrees and 12 degrees and a distance from a tip of the vane and a skin of an aircraft is between 3.1 and 3.2 inches.

17. The angle of attack sensor of claim 15, wherein the vane has a vane height of 71 mm and a vane sweep angle of 38 degrees and the faceplate has a continuous incline with a slope of 8 degrees.

18. An angle of attack sensor comprising:
a housing having an open end and a closed end;
a faceplate positioned on the open end of the housing, the faceplate comprising:
a periphery at an outer edge of the faceplate;
a central opening; and
an exterior surface extending from the periphery to the central opening; and
a vane assembly extending through the central opening of the faceplate;
wherein the exterior surface of the faceplate slopes downward and outward from the central opening to the periphery; and
wherein the exterior surface of the faceplate has a slope equal to or between 6 degrees and 30 degrees.

19. The angle of attack sensor of claim 18, wherein the faceplate has a frustoconical exterior surface.

20. The angle of attack sensor of claim 18, wherein the vane assembly includes a vane hub positioned in the central opening of the faceplate and a vane connected to the vane hub, an exterior surface of the vane hub and the vane being above the skin of the aircraft.

21. The angle of attack sensor of claim 20, wherein the exterior surface of the faceplate has a slope equal to or between 6 degrees and 12 degrees and the distance from a tip of the vane and a skin of an aircraft is between 3.1 and 3.2 inches.

22. The angle of attack sensor of claim 20, wherein the vane has a height of 71 mm and a vane sweep angle of 38 degrees and the faceplate has a slope of 8 degrees.

23. The angle of attack sensor of claim 18, wherein the faceplate slopes downward and outward from the central opening to the periphery at the upstream portion of the faceplate.

* * * * *